United States Patent
Zhang et al.

(10) Patent No.: US 12,455,474 B2
(45) Date of Patent: Oct. 28, 2025

(54) BACKLIGHT DISPLAY ASSEMBLY AND ELECTRONIC DEVICE

(71) Applicant: HUAWEI TECHNOLOGIES CO., LTD., Guangdong (CN)

(72) Inventors: Youming Zhang, Shenzhen (CN); Hui Ren, Shenzhen (CN); Chuangchuang Liu, Shenzhen (CN); Zheng Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/758,156

(22) Filed: Jun. 28, 2024

(65) Prior Publication Data

US 2024/0353710 A1    Oct. 24, 2024

Related U.S. Application Data

(63) Continuation of application No. PCT/CN2021/142863, filed on Dec. 30, 2021.

(51) Int. Cl.
*G02F 1/13357*    (2006.01)

(52) U.S. Cl.
CPC .... *G02F 1/133606* (2013.01); *G02F 1/13362* (2013.01); *G02F 1/133621* (2013.01)

(58) Field of Classification Search
CPC .......... G02F 1/133606; G02F 1/13362; G02F 1/133621; G02F 1/133504; G02F 2201/305; G02F 2202/36; G02B 5/1819; G02B 5/32

See application file for complete search history.

(56) References Cited

U.S. PATENT DOCUMENTS

2013/0038821 A1* 2/2013 Wu .................... G02F 1/133504
                                                                349/96
2017/0242300 A1* 8/2017 Lim ...................... G02F 1/1334
(Continued)

FOREIGN PATENT DOCUMENTS

CN    1945402 A    4/2007
CN    101477219 A    7/2009
(Continued)

OTHER PUBLICATIONS

English Machine Translation of Okada ) (JP2007011313 (Year: 2025).*

*Primary Examiner* — Donald L Raleigh
(74) *Attorney, Agent, or Firm* — WOMBLE BOND DICKINSON (US) LLP

(57) ABSTRACT

A backlight display assembly and an apparatus on which the backlight display assembly is deployed are disclosed, to effectively improve light utilization of the backlight display assembly. The backlight display assembly includes a light filter layer, a spectrum splitting layer, and a backlight layer. The light filter layer includes a plurality of light filter units, and each light filter unit includes a plurality of different light filters. The spectrum splitting layer is disposed on one side of the light filter layer, and the spectrum splitting layer and the light filter layer are spaced from each other. The spectrum splitting layer includes a micro-nano structure including a plurality of strip structures, and an arrangement direction of the plurality of strip structures is consistent with an arrangement direction of the plurality of different light filters.

20 Claims, 13 Drawing Sheets

(56) References Cited

U.S. PATENT DOCUMENTS

2021/0200040 A1* 7/2021 Zhu .................. G02F 1/134309
2022/0155635 A1* 5/2022 Weindorf .......... G02F 1/133601

FOREIGN PATENT DOCUMENTS

| | | | |
|---|---|---|---|
| CN | 101620290 A | 1/2010 | |
| CN | 106556966 A | 4/2017 | |
| CN | 206618926 U | 11/2017 | |
| CN | 112835205 A | 5/2021 | |
| DE | 112020001268 T5 | 11/2021 | |
| JP | 2007011313 A * | 1/2007 | ........... G02F 1/1335 |
| JP | 2009139411 A | 6/2009 | |

* cited by examiner

BACKLIGHT DISPLAY ASSEMBLY AND ELECTRONIC DEVICE

CROSS-REFERENCE TO RELATED APPLICATIONS

This application is a continuation of International Application No. PCT/CN2021/142863, filed on Dec. 30, 2021, the disclosure of which is hereby incorporated by reference in its entirety.

TECHNICAL FIELD

This application relates to the backlight display field, and in particular, to a backlight display assembly and an electronic device.

BACKGROUND

A display is an output device for outputting an image, and is a core input/output component of many electronic devices. Common display technologies include liquid crystal display (LCD), organic light emitting diode display (OLED), and projection display. A backlight display technology represented by the LCD technology is widely applied to many scenarios with various consumer electronic products such as a mobile phone, a television, a personal digital assistant, a digital camera, a laptop computer, and a desktop computer due to advantages such as low power consumption and a mature scale processing process.

However, light utilization of a backlight display apparatus is low. For example, as shown in FIG. 1, an LCD usually includes a backlight layer, two polarization filter layers, an electronically controlled liquid crystal layer, and an RGB (Red Green Blue) color filter layer. Theoretically, wide-spectrum white light emitted by the backlight layer loses more than 50% of a light amount after passing through a first polarization filter layer, and loses more than 66.7% of a light amount after passing through the RGB color filter layer. In an ideal case, a final display light intensity is only 16.7% of an intensity of a light signal emitted by the backlight layer (backlight intensity). An actual display light intensity is less than 5.6% of the backlight intensity, in other words, more than 90% of the light is not used. Therefore, how to improve the light utilization of the backlight display apparatus is an urgent problem to be resolved.

SUMMARY

Embodiments of this application provide a backlight display assembly and an apparatus in which the backlight display assembly is deployed, to improve light utilization of a backlight display apparatus.

In view of this, a first aspect of this application provides a backlight display assembly, including a backlight layer, a spectrum splitting layer, and a light filter layer. The backlight layer is configured to generate backlight. The backlight layer may be sometimes referred to as backlight, a backlight unit, a backlight structure, a backlight module, a backlight system, or the like. The backlight layer may have an optical film, a light diffuser like a light diffuser (light diffuser layer), and a light emitting diode array. The light emitting diode array may include a two-dimensional array of light sources (such as light emitting diodes) that generate backlight. As an embodiment, the light emitting diodes may be arranged in rows and columns. It should be noted that a structure of the backlight layer to be used is not limited in embodiments of this application, and any structure that can generate backlight may be used in embodiments of this application. The spectrum splitting layer is disposed between the backlight layer and the light filter layer. The light filter layer includes a plurality of light filter units, where each light filter unit includes a plurality of different light filters. For example, a red light filter, a green light filter, and a blue light filter form a light filter unit. A unit including a red light filter, two green light filters, and a blue light filter includes same light filters (that is, the two green light filters). This is not the light filter unit described in embodiments of this application. The spectrum splitting layer is configured to split, based on a frequency, an optical signal sent by the backlight layer. The spectrum splitting layer and an electronically controlled liquid crystal layer are spaced from each other. The spectrum splitting layer includes a micro-nano structure including a plurality of strip structures, and an arrangement direction of the plurality of strip structures is consistent with an arrangement direction of the plurality of different light filters. The micro-nano structure is configured to: separate an optical signal of a first frequency from the optical signal sent by the backlight layer, and converge the optical signal of the first frequency onto a first light filter in the plurality of different light filters, where the first light filter is configured to select the optical signal of the first frequency. In embodiments of this application, it is proved through experiments that this design can significantly improve backlight utilization of the backlight display apparatus.

In a possible implementation of the first aspect, the plurality of strip structures are aligned from the beginning to the end. For convenience of industrial design, the plurality of strip structures may be deployed on a same plane.

In a possible implementation of the first aspect, the spectrum splitting layer includes a plurality of groups of micro-nano structures, and the plurality of groups of micro-nano structures are periodically distributed. In this implementation, a structure of the spectrum splitting layer is provided, thereby increasing diversity of solutions. In addition, because the plurality of groups of micro-nano structures are periodically distributed, each area of the spectrum splitting layer can perform optical splitting processing on an optical signal in a unified manner, to ensure that display brightness and display color of each area in a display area are uniform, thereby improving a display effect.

In a possible implementation of the first aspect, a plurality of groups of light filtering units are periodically distributed, and one group of the light filtering units corresponds to one group of the micro-nano structures. In this structure manner, a distribution period of the light filter unit is the same as a distribution period of the micro-nano structure, so that display brightness and display color of each area in the display area can be better ensured to be uniform, thereby improving a display effect.

In a possible implementation of the first aspect, the spectrum splitting layer further includes a first medium, and a refractive index of the first medium is different from a refractive index of a medium included in the micro-nano structure.

In a possible implementation of the first aspect, a second medium exists between the spectrum splitting layer and the light filter layer, and a loss caused by the second medium to a light source emitted by the backlight layer is less than a first preset threshold. In this implementation, the loss caused by the second medium to the light source emitted by the backlight layer is less than the preset threshold. This helps reduce the loss of the light source emitted by the backlight, and helps improve backlight utilization.

In a possible implementation of the first aspect, the second medium is a medium whose transparency is greater than a second preset threshold. In this implementation, the second medium may be any medium whose transparency is greater than the second preset threshold. A loss of a transparent medium on the light source is usually low. In this structure manner, the transparent medium may be directly used as the first medium, to reduce the loss of the light source emitted by the backlight, and help improve backlight utilization.

In a possible implementation of the first aspect, the second medium includes at least one of silicon dioxide, silicon nitride, silicon carbide, aluminum trioxide, titanium dioxide, gallium nitride, polymethyl methacrylate, a photoresist material, vacuum, or air. In this implementation, several second media are provided, thereby increasing diversity of the solution.

In a possible implementation of the first aspect, the micro-nano structure includes one of a supersurface or a diffractive optical element (DOE).

In a possible implementation of the first aspect, the assembly further includes a substrate, and the micro-nano structure is distributed on the substrate. In this implementation, a structure of the backlight display assembly is further improved, so that the backlight display assembly is more stable.

In a possible implementation of the first aspect, a loss caused by the substrate to the light source emitted by the backlight layer is less than a third preset threshold.

In a possible implementation of the first aspect, the assembly further includes a first polarization layer, a second polarization layer, and a liquid crystal layer, the first polarization layer is disposed between the backlight layer and the spectrum splitting layer, the liquid crystal layer is disposed between the spectrum splitting layer and the light filter layer, the spectrum splitting layer and the liquid crystal layer are spaced from each other, and the second polarization layer is disposed between the liquid crystal layer and the light filter layer; or the light filter layer is disposed between the liquid crystal layer and the second polarization layer. In this implementation, a manner of improving a conventional LCD structure is provided, so that utilization of backlight display of the conventional LCD can be significantly improved.

In a possible implementation of the first aspect, the assembly further includes a first polarization layer, a second polarization layer, and a liquid crystal layer, the first polarization layer is disposed between the spectrum splitting layer and the liquid crystal layer, and the second polarization layer is disposed between the liquid crystal layer and the light filter layer; or the light filter layer is disposed between the liquid crystal layer and the second polarization layer, the liquid crystal layer is disposed on a side close to the spectrum splitting layer, and the light filter layer is disposed on a side away from the spectrum splitting layer. In this implementation, a manner of improving a conventional LCD structure is provided, so that utilization of backlight display of the conventional LCD can be significantly improved.

In a possible implementation of the first aspect, heights of the plurality of strip structures are the same, and each of the strip structures is a cuboid.

In a possible implementation of the first aspect, shapes of a plurality of strip structures corresponding to the first light filter are different from shapes of a plurality of strip structures corresponding to the second light filter; the micro-nano structure is further configured to: separate an optical signal of a second frequency from the optical signal sent by the backlight layer, and converge the optical signal of the second frequency onto a second light filter in the plurality of different light filters; and the second light filter is configured to select the optical signal of the second frequency.

A second aspect of this application provides a backlight display assembly, including a backlight layer, a spectrum splitting layer, and a light filter layer. The spectrum splitting layer is disposed between the backlight layer and the light filter layer. The spectrum splitting layer and the light filter layer are spaced from each other. The spectrum splitting layer includes at least two media having different refractive indexes, and one of the at least two media having different refractive indexes is a micro-nano structure. The micro-nano structure may have a plurality of different representation manners. For example, the micro-nano structure may be a combination of micro-nano structures of at least one shape. An optical signal sent by the backlight layer is split by the spectrum splitting layer and then reaches the light filter layer. In one embodiment, the spectrum splitting layer is configured to split, based on a frequency, the optical signal sent by the backlight layer.

In the solution provided in this embodiment of this application, the spectrum splitting layer including the micro-nano structure is disposed between the backlight layer and the light filter layer, and the spectrum splitting layer and the light filter layer are spaced from each other. Compared with a backlight display assembly that does not use a spectrum splitting layer, by using such a structure, a large quantity of optical signals in a same frequency in optical signals sent by the backlight layer can reach a target area in a light filter layer, and a frequency of the target area is the same frequency. An example in which the filter layer is an RGB filter layer is used for description. According to the solution provided in this application, most red light in incident light of a green light filter and a blue light filter can be refracted to incident light of a red light filter, most blue light in incident light of the green light filter and the red light filter can be refracted to incident light of the blue light filter, and most green light in incident light of the red light filter and the blue light filter can be refracted to incident light of the green light filter. This greatly improves backlight utilization.

In a possible implementation of the second aspect, the spectrum splitting layer includes a plurality of groups of micro-nano structures, and the plurality of groups of micro-nano structures are periodically distributed. In this implementation, a structure of the spectrum splitting layer is provided, thereby increasing diversity of solutions. In addition, because the plurality of groups of micro-nano structures are periodically distributed, each area of the spectrum splitting layer can perform optical splitting processing on an optical signal in a unified manner, to ensure that display brightness and display color of each area in a display area are uniform, thereby improving a display effect.

In a possible implementation of the second aspect, the light filter layer includes a plurality of groups of light filter units, and the plurality of groups of light filter units may be periodically distributed, or may not be periodically distributed. One group of light filter units corresponds to one group of micro-nano structures. Simulation experiments show that this structure can significantly improve backlight utilization. In addition, in this structure manner, a distribution period of the light filter unit is the same as a distribution period of the micro-nano structure, so that display brightness and display color of each area in the display area can be better ensured to be uniform, thereby improving a display effect.

In a possible implementation of the second aspect, the micro-nano structure includes a plurality of columnar structures. In this implementation, a micro-nano structure is provided, and a top view of each of the plurality of columnar structures is one of a regular triangle, a regular quadrilateral, or a regular hexagon. In an implementation, all of the plurality of columnar structures have a same shape. In a possible implementation, a shape of a top view surface of each columnar structure is a shape in which seamless splicing can be performed, and the top view surface is in a direction that faces a supersurface and is perpendicular to the spectrum splitting layer. In addition, the plurality of columnar structures may be spliced into a large structure because the plurality of columnar structures are similar. For example, the columnar structure may be a cube structure, and a plurality of cubes may be spliced into a cuboid shape or another irregular shape due to proximity. In a common processing manner, the micro-nano structure is processed into a columnar structure. In this implementation, the micro-nano structure includes the plurality of columnar structures, which is compatible with a common processing manner and helps reduce costs.

In a possible implementation of the second aspect, a third medium exists between the spectrum splitting layer and the light filter layer, and a loss caused by the third medium to a light source emitted by the backlight layer is less than a preset threshold. In this implementation, the loss caused by the third medium to the light source emitted by the backlight layer is less than the preset threshold. This helps reduce the loss of the light source emitted by the backlight, and helps improve backlight utilization.

In a possible implementation of the second aspect, the third medium is a transparent medium. In this implementation, the third medium may be any medium whose transparency is greater than a second preset threshold. A loss of a transparent medium on the light source is usually low. In this structure manner, the transparent medium may be directly used as the third medium, to reduce the loss of the light source emitted by the backlight, and help improve backlight utilization.

In a possible implementation of the second aspect, the third medium includes at least one of silicon dioxide, silicon nitride, silicon carbide, aluminum trioxide, titanium dioxide, gallium nitride, polymethyl methacrylate, a photoresist material, vacuum, or air. In this implementation, several third media are provided, thereby increasing diversity of the solution.

In a possible implementation of the second aspect, the spectrum splitting layer includes one of a supersurface or a diffractive optical element (DOE).

In a possible implementation of the second aspect, the assembly further includes a substrate, the micro-nano structure is distributed on the substrate, and the substrate is configured to support the spectrum splitting layer. In this implementation, a structure of the backlight display assembly is further improved, so that the backlight display assembly is more stable.

In a possible implementation of the second aspect, a loss caused by the substrate to the light source emitted by the backlight layer is less than the preset threshold.

In a possible implementation of the second aspect, the backlight display assembly further includes a first polarization layer, a second polarization layer, and a liquid crystal layer, the first polarization layer is disposed between the backlight layer and the spectrum splitting layer, the liquid crystal layer is disposed between the spectrum splitting layer and the light filter layer, the spectrum splitting layer and the liquid crystal layer are spaced from each other, and the second polarization layer is disposed between the liquid crystal layer and the light filter layer; or the light filter layer is disposed between the liquid crystal layer and the second polarization layer. In this implementation, a manner of improving a conventional LCD structure is provided, so that utilization of backlight display of the conventional LCD can be significantly improved.

In a possible implementation of the second aspect, the backlight display assembly further includes a first polarization layer, a second polarization layer, and a liquid crystal layer, the first polarization layer is disposed between the spectrum splitting layer and the liquid crystal layer, and the second polarization layer is disposed between the liquid crystal layer and the light filter layer; or the light filter layer is disposed between the liquid crystal layer and the second polarization layer, the liquid crystal layer is disposed on a side close to the spectrum splitting layer, and the light filter layer is disposed on a side away from the spectrum splitting layer. A manner of improving a conventional LCD structure is provided, which can significantly improve utilization of backlight display of the conventional LCD.

A third aspect of this application provides an electronic device, where the electronic device includes a display, and the display includes the backlight display assembly described in any one of the first aspect or the possible implementations of the first aspect. Alternatively, the display includes the backlight display assembly described in any one of the second aspect or the possible implementations of the second aspect.

In a possible implementation of the third aspect, the electronic device is at least one of a desktop computer, a laptop computer, a tablet computer, a mobile phone, a television, an in-vehicle device, glasses, a watch, or a band.

For beneficial effects brought by the third aspect and the implementations of the third aspect, refer to the beneficial effects brought by the first aspect and the implementations of the first aspect for understanding. Details are not described herein again.

A fourth aspect of this application provides a display screen, where the display screen includes the backlight display assembly described in any one of the first aspect or the possible implementations of the first aspect.

In a possible implementation of the fourth aspect, the display screen may further include a housing, and the backlight display assembly is accommodated in the housing.

In a possible implementation of the fourth aspect, the display screen may further include a bracket, and the housing is mounted on the bracket.

For beneficial effects brought by the fourth aspect and the implementations of the fourth aspect, refer to the beneficial effects brought by the first aspect and the implementations of the first aspect for understanding. Details are not described herein again.

A fifth aspect of this application provides a display, where the display includes the backlight display assembly described in any one of the first aspect or the possible implementations of the first aspect. Alternatively, the display includes the backlight display assembly described in any one of the second aspect or the possible implementations of the second aspect.

In a possible implementation of the fifth aspect, the display includes a display screen, and the display screen includes the backlight display assembly described in any one of the first aspect or the possible implementations of the first aspect.

In a possible implementation of the fifth aspect, the display may further include a housing, and the backlight display assembly is accommodated in the housing.

In a possible implementation of the fifth aspect, the display may further include a bracket, and the housing is mounted on the bracket.

For beneficial effects brought by the fifth aspect and the implementations of the fifth aspect, refer to the beneficial effects brought by the first aspect and the implementations of the first aspect for understanding. Details are not described herein again.

A sixth aspect of this application provides a method for using a backlight display assembly, where the backlight display assembly includes a backlight layer, a spectrum splitting layer, and a light filter layer, the light filter layer includes a first target area and a second target area, a frequency of the first target area is a first frequency, and a frequency of the second target area is different from the frequency of the first target area. The method includes: sending an optical signal by using the backlight layer; and splitting, by using the spectrum splitting layer based on a frequency, the optical signal sent by the backlight layer, so that a part of the optical signal of the first frequency arrives at the first target area of the light filter layer, where the second target area is an area in which the part of the optical signal of the first frequency arrives at the light filter layer when the optical signal is not split by the spectrum splitting layer.

In a possible implementation of the sixth aspect, the splitting, by using the spectrum splitting layer based on a frequency, the optical signal sent by the backlight layer includes: splitting, by using the spectrum splitting layer including a plurality of groups of micro-nano structures, the optical signal sent by the backlight layer based on the frequency, where the plurality of groups of micro-nano structures are periodically distributed.

In a possible implementation of the sixth aspect, the splitting, by using the spectrum splitting layer based on a frequency, the optical signal sent by the backlight layer, so that a part of the optical signal of the first frequency arrives at the first target area of the light filter layer includes: splitting, by using the spectrum splitting layer based on the frequency, the optical signal sent by the backlight layer, so that a part of the optical signal of the first frequency arrives at the first target area of the light filter layer including a plurality of groups of light filtering units, where the plurality of groups of light filtering units are periodically distributed, and one group of light filtering units corresponds to one group of micro-nano structures.

In a possible implementation of the sixth aspect, the micro-nano structure includes a plurality of columnar structures.

In a possible implementation of the sixth aspect, the backlight display assembly further includes a third medium, and the splitting, by using the spectrum splitting layer based on a frequency, the optical signal sent by the backlight layer, so that a part of the optical signal of the first frequency arrives at the first target area of the light filter layer includes: splitting, by using the spectrum splitting layer based on the frequency, the optical signal sent by the backlight layer, so that a part of the optical signal of the first frequency arrives at the first target area of the light filter layer after passing through the third medium, where a loss caused by the third medium to a light source emitted by the backlight layer is less than a first preset threshold.

In a possible implementation of the sixth aspect, the third medium is a medium whose transparency is greater than a second preset threshold.

In a possible implementation of the sixth aspect, the third medium includes at least one of silicon dioxide, silicon nitride, silicon carbide, aluminum trioxide, titanium dioxide, gallium nitride, polymethyl methacrylate, a photoresist material, vacuum, or air.

In a possible implementation of the sixth aspect, the micro-nano structure includes one of a supersurface or a diffractive optical element (DOE).

In a possible implementation of the sixth aspect, the assembly further includes a substrate, and the micro-nano structure is distributed on the substrate.

In a possible implementation of the sixth aspect, a loss caused by the substrate to the light source emitted by the backlight layer is less than a third preset threshold.

In a possible implementation of the sixth aspect, the backlight display assembly further includes a first polarization layer, a second polarization layer, and a liquid crystal layer, and the method further includes: enabling, by using the first polarization layer, an optical signal that is in optical signals sent by the backlight layer and that has a same polarization direction as the first polarization layer to pass through. The splitting, by using the spectrum splitting layer based on a frequency, the optical signal sent by the backlight layer, so that a part of the optical signal of the first frequency arrives at the first target area of the light filter layer includes: splitting, by using the spectrum splitting layer, an optical signal of the first polarization layer based on the frequency, so that a part of the optical signal of the first frequency in the optical signal of the first polarization layer arrives at the first target area of the light filter layer through the liquid crystal layer. The method further includes: enabling, by using the second polarization layer, an optical signal that is in the optical signals passing through the light filter layer and that has a same polarization direction as the second polarization layer to pass through.

In a possible implementation of the sixth aspect, the backlight display assembly further includes a first polarization layer, a second polarization layer, and a liquid crystal layer, and the method further includes: enabling, by using the first polarization layer, an optical signal that is in optical signals sent by the backlight layer and that has a same polarization direction as the first polarization layer to pass through. The splitting, by using the spectrum splitting layer based on a frequency, the optical signal sent by the backlight layer, so that a part of the optical signal of the first frequency arrives at the first target area of the light filter layer includes: splitting, by using the spectrum splitting layer, an optical signal of the first polarization layer based on the frequency, so that a part of the optical signal of the first frequency in the optical signal of the first polarization layer arrives at the first target area of the light filter layer through the liquid crystal layer and the second polarization layer.

In a possible implementation of the sixth aspect, the backlight display assembly further includes a first polarization layer, a second polarization layer, and a liquid crystal layer, and the splitting, by using the spectrum splitting layer based on a frequency, the optical signal sent by the backlight layer, so that a part of the optical signal of the first frequency arrives at the first target area of the light filter layer includes: splitting, by using the spectrum splitting layer based on the frequency, the optical signal sent by the backlight layer, so that a part of the optical signal of the first frequency arrives at the first target area of the light filter layer after passing through the first polarization layer and the liquid crystal layer. The method further includes: enabling, by using the second polarization layer, an optical signal that is in the optical signals passing through the light filter layer and that has a same polarization direction as the second polarization layer to pass through.

In a possible implementation of the sixth aspect, the backlight display assembly further includes a first polarization layer, a second polarization layer, and a liquid crystal layer, and the splitting, by using the spectrum splitting layer based on a frequency, the optical signal sent by the backlight layer, so that a part of the optical signal of the first frequency arrives at the first target area of the light filter layer includes: splitting, by using the spectrum splitting layer based on the frequency, the optical signal sent by the backlight layer, so that a part of the optical signal of the first frequency arrives at the first target area of the light filter layer after passing through the first polarization layer, the liquid crystal layer, and the second polarization layer.

For beneficial effects brought by the sixth aspect and the implementations of the sixth aspect, refer to the beneficial effects brought by the second aspect and the implementations of the second aspect for understanding. Details are not described herein again.

DESCRIPTION OF EMBODIMENTS

The following describes the technical solutions in embodiments of this application with reference to the accompanying drawings in embodiments of this application. It is clear that the described embodiments are merely a part rather than all of embodiments of this application. All other embodiments obtained by a person skilled in the art based on embodiments of this application without creative efforts shall fall within the protection scope of this application.

For ease of understanding, the following first explains and describes technical terms in this application.

Display/display screen: A display is an output device for outputting an image, and is a core input/output component of many electronic devices. Common display technologies include LCD, organic light emitting diode (OLED) display, and projection display. A backlight display technology represented by the LCD technology is widely applied to many scenarios such as a desktop computer/laptop computer/tablet computer display, a smart screen/television, a mobile phone screen, and an in-vehicle display due to advantages such as low power consumption and a mature scale processing process.

Figure 1:
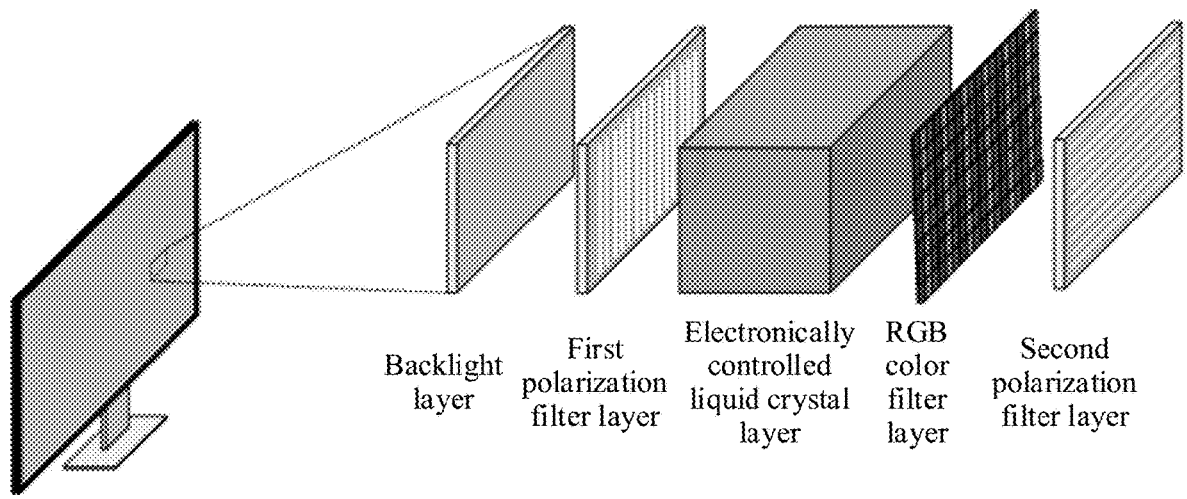
FIG. 1 is a schematic diagram of a structure of an LCD.

An LCD mainly includes a backlight layer, two polarization filter layers, an electronically controlled liquid crystal layer, and an RGB color filter layer. It should be noted that, in this application, color filtering is sometimes referred to as light filtering, and the two have a same meaning. FIG. 1 is a schematic diagram of a structure of an LCD. Wide-spectrum incoherent white light emitted by a backlight layer passes through a first polarization filter layer. Polarized light transmitted in a first polarization direction passes through an electronically controlled liquid crystal layer and an RGB color filter layer and passes through a second polarization filter layer; and is emitted to display image information. A liquid crystal molecule in the electronically controlled liquid crystal layer is deflected by a voltage applied by a transparent electrode controlled by a thin film transistor (TFT) layer. The deflected liquid crystal molecule reverses a polarization direction of polarized light that is incident by a first polarization filter layer, to control an amount of light emitted by emergent light of each pixel, that is, brightness. When the electronically controlled liquid crystal layer does not reverse the polarization direction of the incident polarized light completely, because polarization directions of the two polarization filters are orthogonal, theoretically, no light is emitted from the pixel, in other words, the pixel is in an off state, and the brightness is the smallest. When the electronically controlled liquid crystal layer reverses the polarization direction of the incident polarized light by 90 degrees, the pixel is in a completely on state, and the brightness is the largest. In embodiments of this application, the electronically controlled liquid crystal layer is sometimes referred to as a liquid crystal layer for short, and the two have a same meaning.

Backlight display means that when a user uses an electronic device, whether a display screen on a body emits backlight to display content more clearly. A difference between backlight display and frontlight display is that backlight is illuminated from a side or the back, while frontlight is illuminated from the front.

Figure 2:
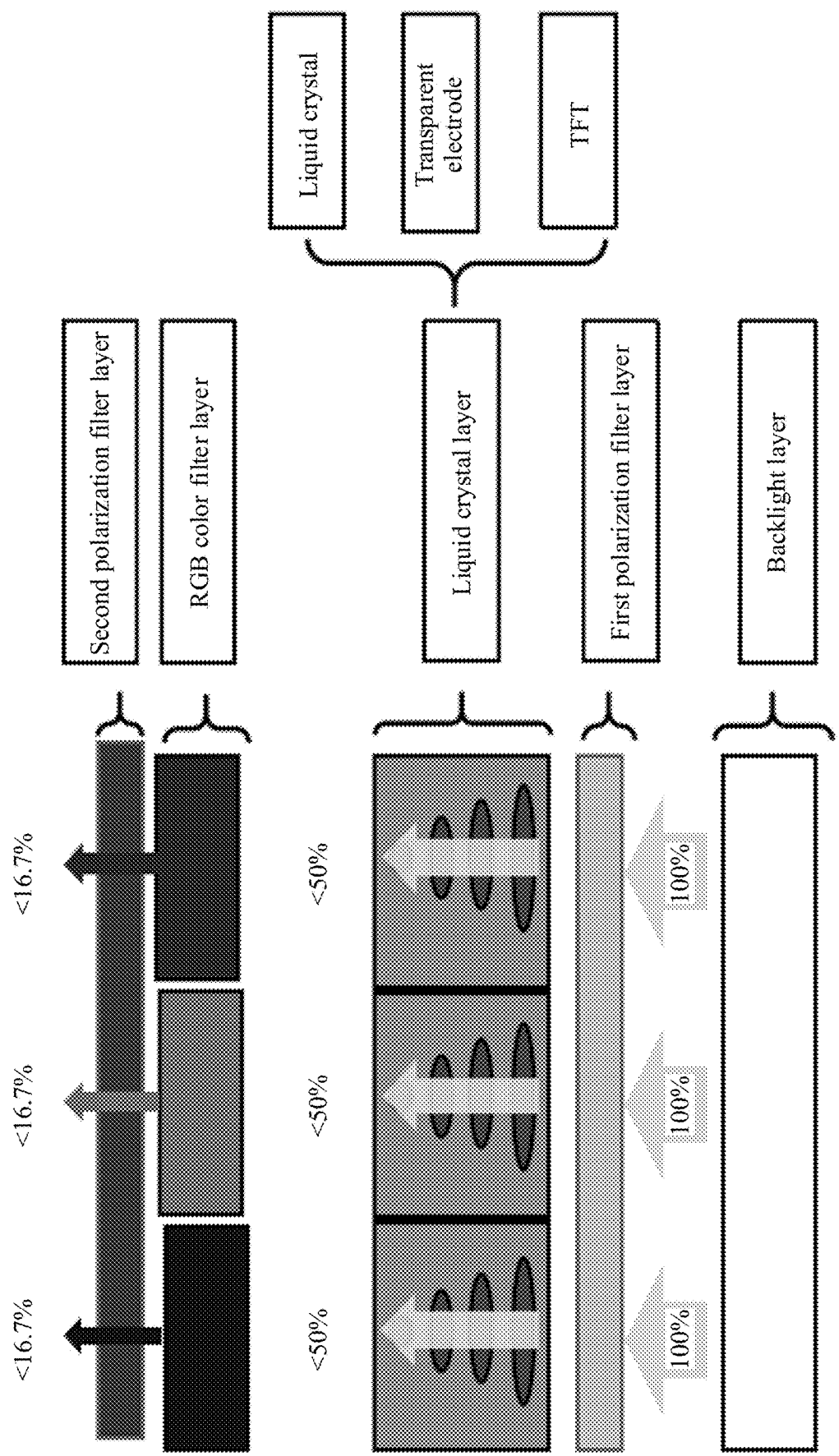
FIG. 2 is a schematic diagram of an optical loss on an LCD.

Light efficiency (or light utilization) of backlight display is actually low, which is determined according to a color filtering principle of backlight display. In one embodiment, as shown in FIG. 2, only half of white light emitted by a backlight layer passes through a first polarization filter layer, causing a loss of more than 50% of the light. Light of a particular color (red, green, or blue) is obtained through filtering by using an RGB color filter layer, causing a loss of more than 66.7% of the light again. Even if the losses of the polarization filter layer and the RGB color filter layer are not considered, a final displayed light intensity is only 16.7% of a backlight intensity. An actual display light intensity is less than 5.6% of the backlight intensity, in other words, more than 90% of the light is not used. In one embodiment, in a backlight display scenario, incident light of the RGB layer is usually an optical signal that includes all wavelengths of 400 nm to 700 nm. To be specific, the incident light is white light, and continues to be transmitted backward after being filtered by the three types of color filters. For each color filter, when the color filter has ideal color filtering effect, a theoretical maximum value of a luminous flux after color filtering is only ⅓ of an incident luminous flux. After the incident light is filtered by the red color filter, theoretically, only red light can continue to be transmitted backward. Therefore, the incident light is the white light, and after the incident light passes through the red color filter, light utilization is about 33.3%. The optical signal emitted by the backlight layer may further pass through the polarization layer, and 50% of the light is lost. Therefore in this scenario, after the optical signal passes through the red color filter, compared with that of the optical signal emitted by the backlight layer, the light utilization of the optical signal is about 16.7%. Similarly, after the incident light is filtered by the green color filter, theoretically, only green light can continue to be transmitted backward. Therefore, the incident light is the white light, and after the incident light is filtered by the green color filter, the light utilization is about 33.3% or 16.7%. After the incident light is filtered by the blue color filter, theoretically, only blue light can continue to be transmitted backward. Therefore, the incident light is the white light, and after the incident light is filtered by the blue color filter, the light utilization is about 33.3% or 16.7%. Low light efficiency causes many problems, which are mainly reflected in the following two aspects: 1. A maximum display brightness of a display is limited. 2. Power consumption and heat of the display are high.

To resolve the foregoing problems, embodiments of this application provide solutions. A spectrum splitting layer is added between a backlight layer and an electronically controlled liquid crystal layer of a backlight display apparatus, and the spectrum splitting layer and the electronically controlled liquid crystal layer are spaced from each other, to improve light utilization of the backlight display apparatus. To better understand the solutions provided in embodiments of this application, the following first describes a research idea of embodiments of this application.

The red color filter is used as an example for further description. If most red light in incident light of the green color filter and the blue color filter can be refracted to the incident light of the red color filter, in all white light emitted from the backlight layer (that is, incident light of the RGB layer), compared with a solution in which no refraction occurs, this application has more red light continuing to be transmitted backward, and improves light utilization. In other words, for incident light of the green color filter and the blue color filter, after the incident light passes through the green color filter and the blue color filter, red light does not pass through. However, if this part of red light can be refracted into incident light of the red color filter, this part of red light can pass through the red color filter, thereby improving light utilization.

A key to the problem lies in how to enable most red light in incident light of the green color filter and the blue color filter to be refracted into incident light of the red color filter, enable most blue light in the incident light of the green color filter and the red color filter to be refracted into incident light of the blue color filter, and enable most green light in incident light of the red color filter and the blue color filter to be refracted to incident light of the green color filter. The applicant finds that, if the spectrum splitting layer including a micro-nano structure is added between the backlight layer and the light filter layer (or the electronically controlled liquid crystal layer), where the micro-nano structure includes a plurality of strip structures, an arrangement direction of the plurality of strip structures is consistent with an arrangement direction of a plurality of color filters, and a distance is kept between the spectrum splitting layer and the color filter layer, this problem can be well resolved. In addition, the applicant performs a large quantity of simulation experiments, to verify the effectiveness of this solution.

Based on the foregoing research idea, the following describes the solutions provided in embodiments of this application.

First, this application provides a backlight display assembly. The backlight display assembly may be used in any backlight display system, and includes but is not limited to a conventional LCD screen, a quantum dot light emitting diode (QLED) screen, a mini light emitting diode (Mini-LED) screen, a white organic light emitting diode (WOLED) screen, and the like. The LCD screen may further include a twisted nematic (TN) type, an in-plane-switching (IPS) type, and a multi-quadrant vertical alignment (VA) type.

The backlight display assembly provided in embodiments of this application may be used in any electronic device on which a display apparatus needs to be installed, including but not limited to a desktop/laptop/panel display, a smart screen/television, an in-vehicle display, a smartphone/watch/band display, a personal digital assistant (PDA) computer, a laptop computer, a machine type communication (MTC) terminal, a point of sales (POS), a head mounted device, a virtual reality (VR) device, an augmented reality (AR) device, and other electronic devices that need to be installed with a display apparatus.

Figure 3:
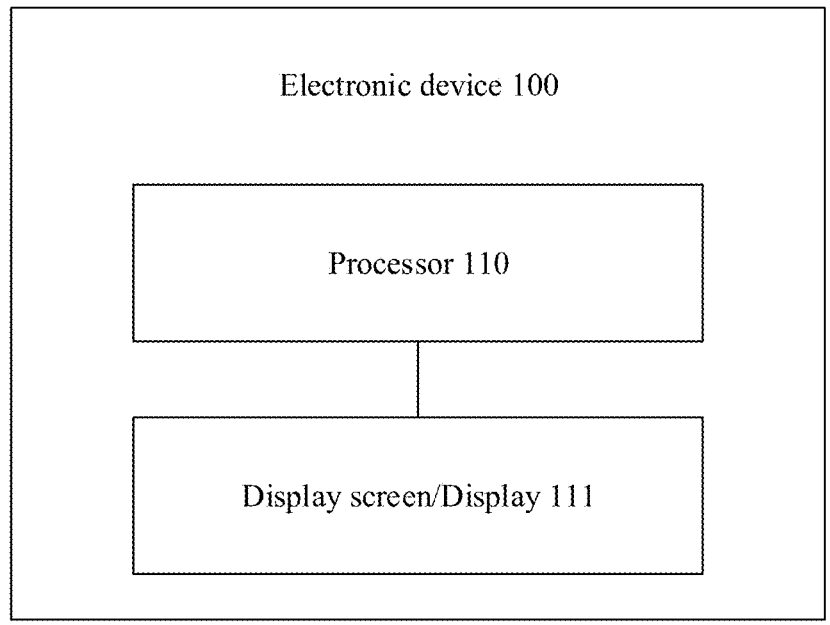
FIG. 3 is a schematic diagram of a structure of an electronic device according to an embodiment of this application.

FIG. 3 is a schematic diagram of a structure of an electronic device 100 according to an embodiment of this application. The electronic device 100 includes a processor 110 and a display screen/display 111. The processor 110 may include one or more processing units, microprocessors, or microcontrollers. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processor (NPU). Different processing units may be independent components, or may be integrated into one or more processors. A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency. In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The processor 110 may be used to control running of software, such as operating system code and an application program, on the electronic device 100. During an operation of the electronic device 100, software running on the electronic device 100 may display an image on the display 111.

The electronic device 100 may include one or more displays 111. The display 111 may be a touchscreen display including a touch sensor configured to collect touch input from a user, or the display 111 may be insensitive to touch. The touch sensor of the display 111 may be arranged based on a capacitive touch sensor electrode array, an acoustic touch sensor structure, a resistive touch component, a force-based touch sensor structure, a light-based touch sensor, or another suitable touch sensor arrangement.

The display 111 may be installed in a housing. A housing that may sometimes be referred to as a shell or a cover may be formed by plastic, glass, ceramic, a fiber composite material, metal (for example, stainless steel and aluminum), another suitable material, or a combination of any two or more of these materials. The housing may be formed using an integrated configuration in which some or all of the housings are processed or molded into a single structure or may be formed using a plurality of structures (for example, an internal frame structure and one or more structures forming an external housing surface). The housing may have a bracket. The housing may have a plurality of parts (for example, housing parts that are moved relative to each other to form a laptop computer or another device with movable parts), may have a shape of a cellular phone or tablet computer, and/or may have other suitable configurations.

It should be noted that the electronic device 100 may further include more or fewer components. This is not limited in this embodiment of this application.

The following describes, with reference to an implementation, a backlight display assembly included in the display 111.

The backlight display assembly provided in this embodiment of this application includes a backlight layer, a spectrum splitting layer, and an electronically controlled liquid crystal layer.

The backlight layer is configured to generate backlight. The backlight layer may be sometimes referred to as backlight, a backlight unit, a backlight structure, a backlight module, a backlight system, or the like. The backlight layer may have an optical film, a light diffuser like a light diffuser (light diffuser layer), and a light emitting diode array. The light emitting diode array may include a two-dimensional array of light sources (such as light emitting diodes) that generate backlight. As an embodiment, the light emitting diodes may be arranged in rows and columns. It should be noted that a structure of the backlight layer to be used is not limited in this embodiment of this application, and any structure that can generate backlight may be used in this embodiment of this application.

Figure 4:
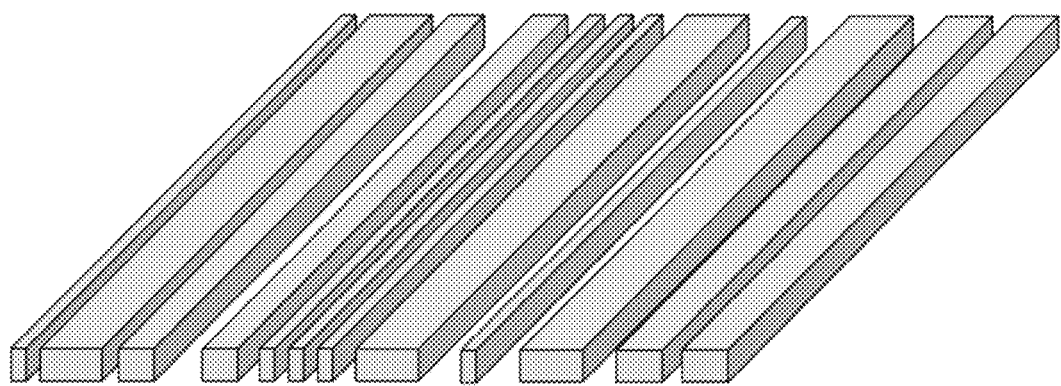
FIG. 4 is a schematic diagram of a structure of a spectrum splitting layer according to an embodiment of this application.
Figure 5A:
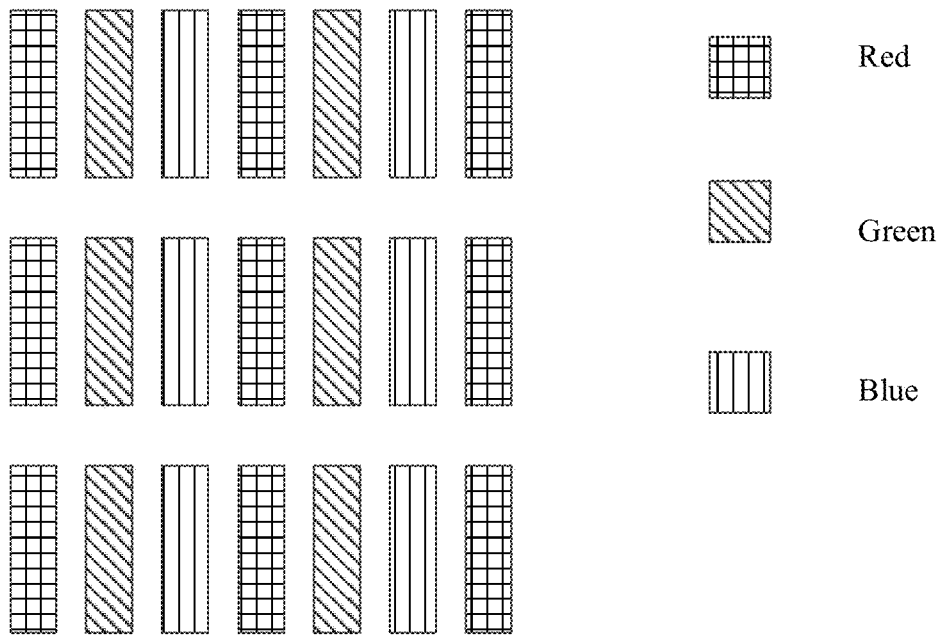
FIG. 5a is a schematic diagram of a structure of a color filter layer.
Figure 5B:
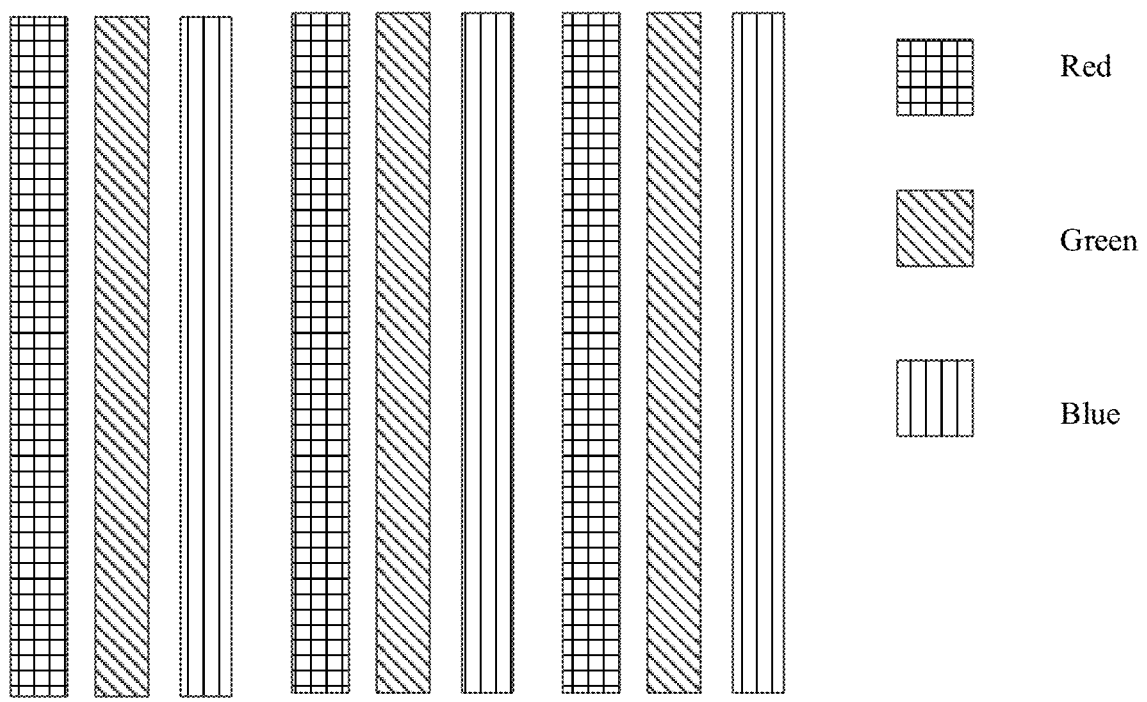
FIG. 5b is a schematic diagram of a structure of another color filter layer.
Figure 5C:
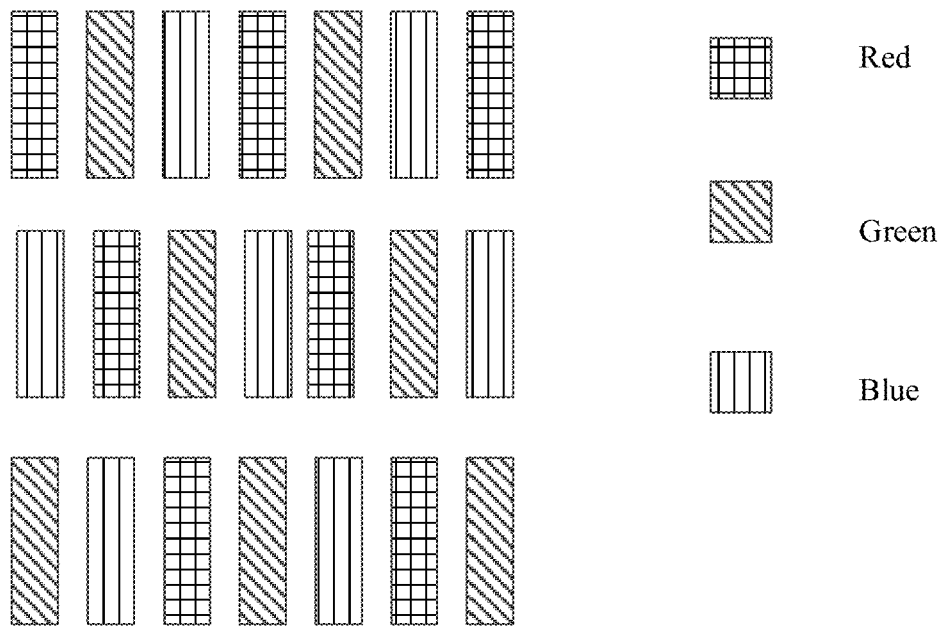
FIG. 5c is a schematic diagram of a structure of still another color filter layer.
Figure 5D:
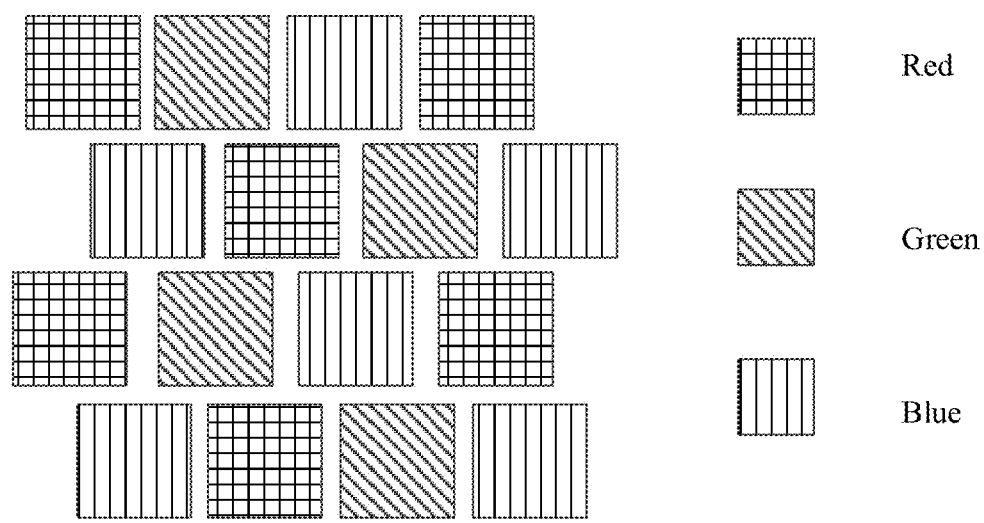
FIG. 5d is a schematic diagram of a structure of yet another color filter layer.
Figure 19:
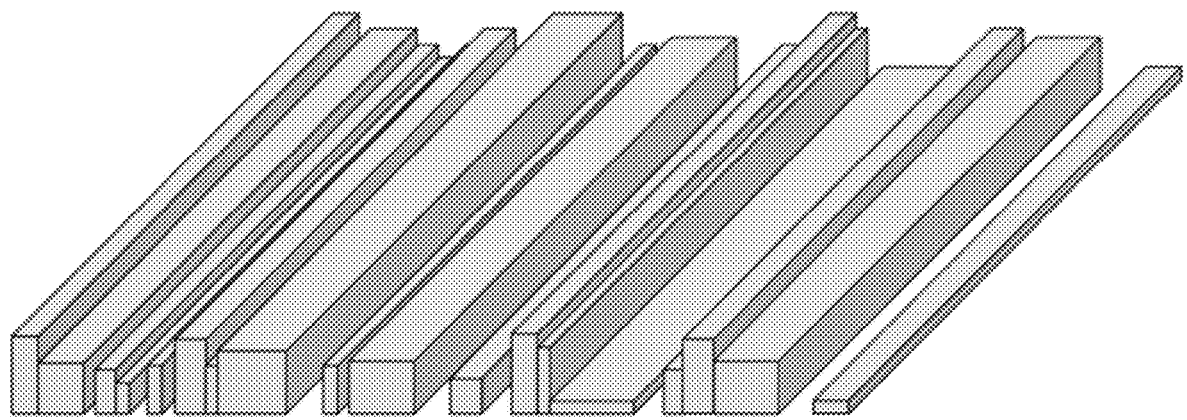
FIG. 19 is a schematic diagram of a structure of still yet another spectrum splitting layer according to an embodiment of this application.
Figure 20:
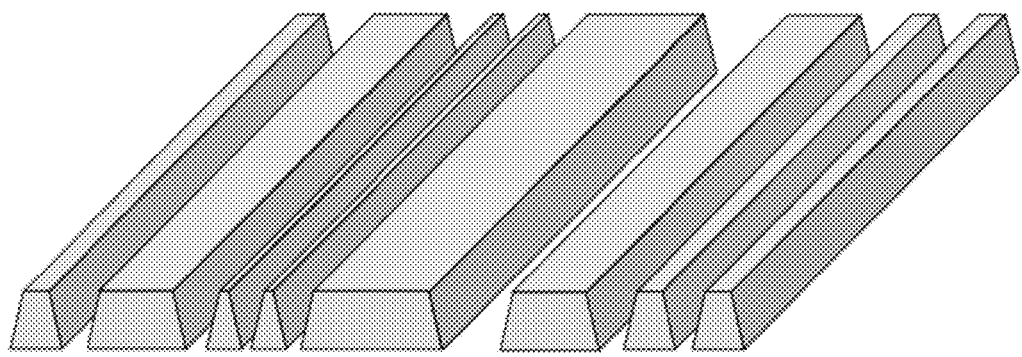
FIG. 20 is a schematic diagram of a structure of further another spectrum splitting layer according to an embodiment of this application.

The spectrum splitting layer is disposed between the backlight layer and the electronically controlled liquid crystal layer, and is configured to split light. The spectrum splitting layer includes a micro-nano structure. The micro-nano structure may have a plurality of different representation manners. For example, the micro-nano structure may be a combination of micro-nano structures of at least one shape. For example, the micro-nano structure may include a plurality of columnar structures. A top view of each of the plurality of columnar structures is one of a regular triangle, a regular quadrilateral, or a regular hexagon. In an implementation, all of the plurality of columnar structures have a same shape. In a possible implementation, a shape of a top view surface of each columnar structure is a shape in which seamless splicing can be performed, and the top view surface is in a direction that faces a supersurface and is perpendicular to the spectrum splitting layer. In addition, the plurality of columnar structures may be spliced into a large structure because the plurality of columnar structures are similar. For example, the columnar structure may be a cube structure, and a plurality of cubes may be spliced into a cuboid shape or another irregular shape due to proximity. In an implementation, the spectrum splitting layer includes a micro-nano structure including a plurality of strip structures. An arrangement direction of the plurality of strip structures is consistent with an arrangement direction of a plurality of different color filters. For example, refer to FIG. 5a. Different color filters are arranged horizontally, and therefore, the arrangement direction of the plurality of strip structures is consistent with the arrangement direction of the different color filters, and is also arranged horizontally. In an implementation, the plurality of strip structures are aligned from the beginning to the end. For convenience of industrial design, the plurality of strip structures are distributed on a same plane. In an implementation, the plurality of strip structures are distributed on the same plane, the plurality of strip structures are parallel, lengths of the plurality of strip structures are equal, and one end of the plurality of strip structures is aligned. It should be noted that, due to a process design error or the like, the plurality of strip structures may not be completely parallel, may not have a completely equal length, and may not be completely aligned at both ends. In this implementation, such an error case is included, that is, the plurality of strip structures are deployed in the same plane, and the plurality of strip structures can be arranged neatly. In a possible implementation, the plurality of strip structures form a grating structure. In some possible implementations, heights of the strip structures may be the same, or may be different. For example, FIG. 4 is a schematic diagram of a possible micro-nano structure including a plurality of strip structures. In a possible implementation, different light filters correspond to different shapes of a plurality of strip structures. For example, a red color filter corresponds to a first part of micro-nano structures (in other words, the red color filter and the first part of micro-nano structures are arranged opposite to each other, or are arranged face to face). The first part of micro-nano structures include a plurality of strip structures (for differentiation, referred to as a group A of strip structures below). A green color filter corresponds to a second part of micro-nano structures. The second part of micro-nano structures include a plurality of strip structures (for differentiation, referred to as a group B of strip structures below). In this case, the group A of strip structures and the group B of strip structures have different shapes. For example, a spacing between strip structures in the group A of strip structures is different from a spacing between strip structures in the group B of strip structures. For another example, both the group A of strip structures and the group B of strip structures are cuboids, but lengths (or widths) of cuboids in the group A of strip structures are different from lengths (or widths) of cuboids in the group B of strip structures. For example, a structure shown in FIG. 19 is used as an example of the group A of strip structures, and a structure shown in FIG. 20 is used as an example of the group B of strip structures.

In addition, the spectrum splitting layer includes two media having different refractive indexes. In other words, the spectrum splitting layer further includes at least one other medium having a refractive index different from that of a medium included in the micro-nano structure. In this way, light emitted by the backlight layer is transmitted to a color filter layer after being split. In a possible implementation, a medium with a low loss of light may be selected to fabricate the spectrum splitting layer, or a medium with a high transmittance rate of light may be selected to fabricate the spectrum splitting layer, to better reduce a loss of light and improve backlight utilization. For example, in a possible implementation, two transparent media with different refractive indexes may be selected to fabricate the spectrum splitting layer. For example, the transparent medium may be an inorganic transparent material (for example, silicon dioxide, silicon nitride, silicon carbide, aluminum trioxide, titanium dioxide, or gallium nitride), an organic transparent material (for example, polymethyl methacrylate (PMMA), and a photoresist material), air, or vacuum.

In a possible implementation, the spectrum splitting layer may be divided into a plurality of grids, and each grid is filled with a medium, such as the foregoing medium such as the titanium dioxide or the air. In a possible implementation, the spectrum splitting layer is a supersurface or a diffractive optical element (DOE). The supersurface is used as an example for description. The supersurface may be meshed and divided into a plurality of grids. Sizes of the grids may be the same or may be different. Herein, that each grid is a square grid of a same size is used as an example. In one embodiment, for example, a length of a strip structure on the spectrum splitting layer (supersurface) may be 500 nm, and a length of each square grid may be 100 nm. The supersurface may be obtained by filling a medium in the grid. In addition, one medium may be air, and another medium may be a material whose refractive index is different from that of the air, to save a material and improve preparation efficiency of the backlight display assembly.

In a possible implementation, to better support the spectrum splitting layer, the backlight display assembly may further include a substrate. The micro-nano structure is distributed on the substrate. A substrate usually includes a material whose transmittance rate of light is higher than a value, such as silicon dioxide, polymethyl methacrylate (PMMA), or polycarbonate (PC). Alternatively, the substrate may be of a hollow structure to ensure a high transmittance rate.

In a possible implementation, the spectrum splitting layer includes a plurality of groups of micro-nano structures. In addition, in an implementation, the plurality of groups of micro-nano structures are periodically distributed.

The color filter layer includes a plurality of groups of color filter units. The plurality of groups of color filter units may be RGB color filter units. FIG. 5a to FIG. 5d show possible structures of several RGB color filter layers. An arrangement direction of each filter unit in each color filter layer is unique, that is, vertical or horizontal. In an implementation, a distribution period of the color filter unit is consistent with a distribution period of the micro-nano structure. For example, in a possible implementation, a group of color filter units corresponds to a group of micro-nano structures. In a possible implementation, the plurality of groups of color filter units of the color filter layer may not be periodically distributed. When the plurality of groups of color filter units of the color filter layer may not be periodically distributed, a group of color filter units may also correspond to a group of micro-nano structures. Because the plurality of groups of micro-nano structures are periodically distributed, each area of the spectrum splitting layer can perform optical splitting processing on an optical signal in a unified manner, to ensure that display brightness and display color of each area in a display area are uniform, thereby improving a display effect. In a possible implementation, the color filter unit and the micro-nano structure may alternatively not present a regular correspondence.

In a possible implementation, the color filter layer may further include another structure in addition to the color filter unit. This is not limited in this embodiment of this application. For example, in a possible implementation, the color filter layer may further include a microlens and an optical-to-electrical conversion unit. The optical-to-electrical conversion unit is configured to convert an optical signal into an electrical signal. The color filter unit is located between the microlens and the optical-to-electrical conversion unit. A purpose and a function of the microlens are to improve light energy received by the optical-to-electrical conversion unit, and may also be referred to as a quantity of photons in the micro field. Each optical-to-electrical conversion unit is limited to a structure, and cannot be seamlessly connected to another optical-to-electrical conversion unit. Therefore, a large amount of light-sensitive area is lost on an entire sensor. By using the microlens, light received on an entire surface is converged to an optical-to-electrical conversion unit, which greatly improves the utilization efficiency of light. In an implementation, the microlens described above may be replaced with a supersurface.

In addition, the spectrum splitting layer and the electronically controlled liquid crystal layer are spaced from each other. A medium whose transmittance rate of light is higher than a value may be filled in the spacing. For example, a transparent medium may be filled in the spacing. In a possible implementation, the medium filled in the spacing and the medium use by the substrate may be the same.

In the solution provided in this embodiment of this application, the spectrum splitting layer including the foregoing described micro-nano structure is disposed between the backlight layer and the electronically controlled liquid crystal layer, and the spectrum splitting layer and the electronically controlled liquid crystal layer are spaced from each other. Compared with a backlight display assembly that does not use the spectrum splitting layer, this structure can greatly improve backlight utilization.

In addition, to design a structure with better backlight utilization, a structure of the spectrum splitting layer may be continuously adjusted by using an algorithm to meet a design requirement. For example, the following describes a procedure described in FIG. 6.

Figure 6:
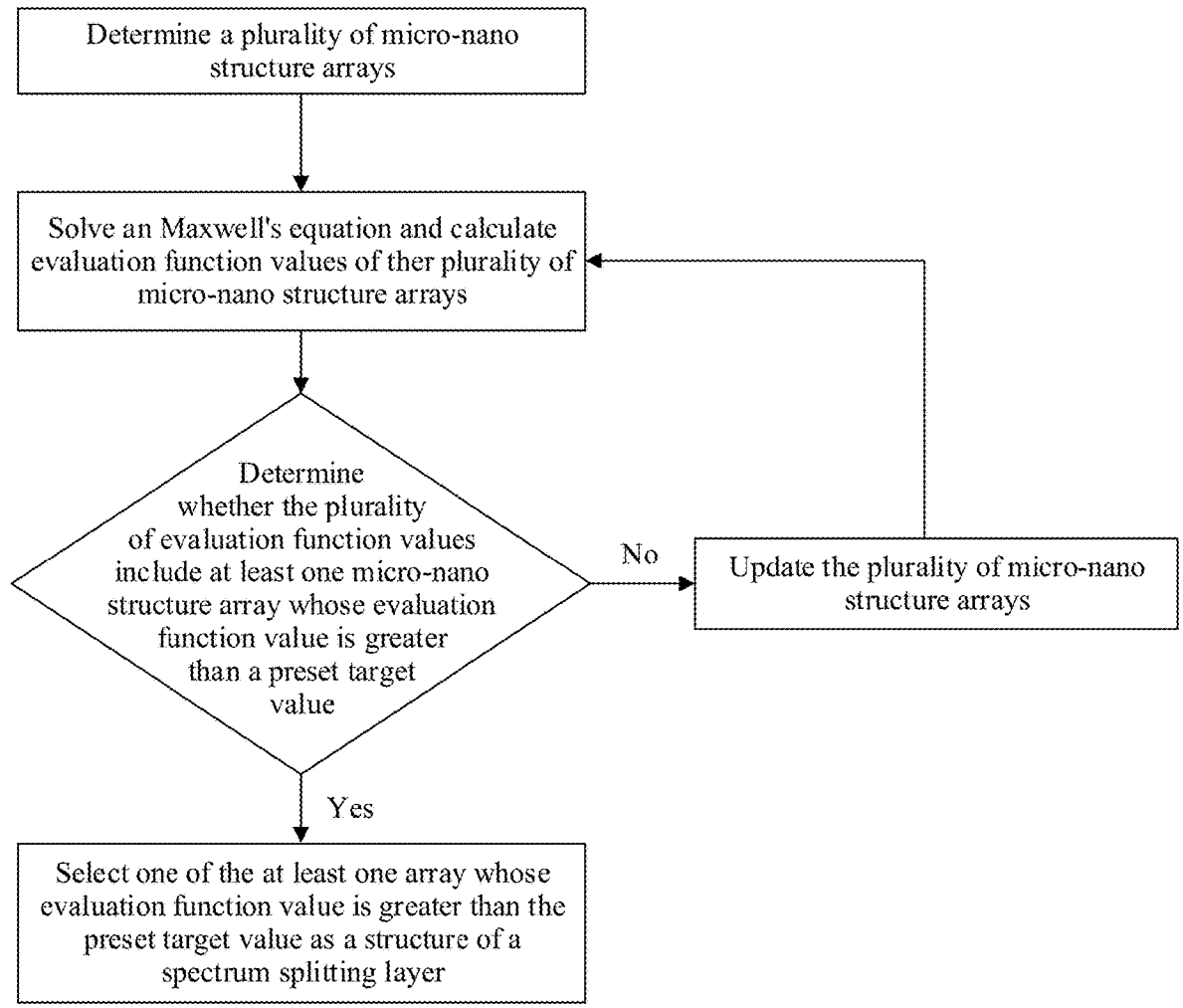
FIG. 6 is a schematic flowchart of designing a spectrum splitting layer according to an embodiment of this application.

A thickness t1 (that is, a distance between a spectrum splitting layer and a color filter layer) of a spacing layer, the material refractive index n0, a micro-nano structure period p1 of the spectrum splitting layer, a thickness h of the spectrum splitting layer, a minimum structure size (critical dimension) p2 of the micro-nano structure, and material refractive indexes n1 and n2 of the spectrum splitting layer are determined based on a processing material, a process, a screen resolution, a pixel arrangement manner, and the like. As shown in FIG. 6, operation 1: Generate a plurality of micro-nano structure arrays. Operation 2: Set a simulation parameter based on the foregoing parameters, and perform simulation calculation to obtain evaluation function values of the plurality of arrays.

$$FOM = \frac{\sum \int_{\lambda_i}^{\lambda_{i+1}} T(\lambda)W(\lambda)}{N_\lambda}$$

$\lambda\_i$ to $\lambda\_i+1$ are an $i^{th}$ spectral division section. $T(\lambda)$ is a transmittance rate at a corresponding spectral location. $W(\lambda)$ represents a weight coefficient of an optical signal with different wavelengths, and is used to adjust a splitting target of optical signals with different wavelengths. For example, for optical signals transmitted by a backlight source, if intensity of an optical signal corresponding to a wavelength range is higher, a higher weight is set for the optical signal with the wavelength range, and if intensity of an optical signal corresponding to a wavelength range is lower, a lower weight is set for the optical signal with the wavelength range. $N\lambda$ is a quantity of frequency samples. $T(\lambda)$ may be obtained by using a time domain difference algorithm, a finite element method (FEM), strictly coupled wave analysis (RCWA), or a scalar diffraction algorithm. Operation 3: Determine whether the plurality of evaluation functions meet a preset design target value. If the plurality of evaluation functions meet the preset design target value, a structure design of the spectrum splitting layer is output. If the plurality of evaluation functions do not meet the preset design target value, a plurality of micro-nano structure arrays are updated, and operation 2 and operation 3 are repeated until a structure that meets a design requirement is obtained.

In a possible implementation, the backlight display assembly may further include another component, for example, further include two polarization filter layers and an electronically controlled liquid crystal layer. The following describes this with reference to two implementations.

Figure 7:
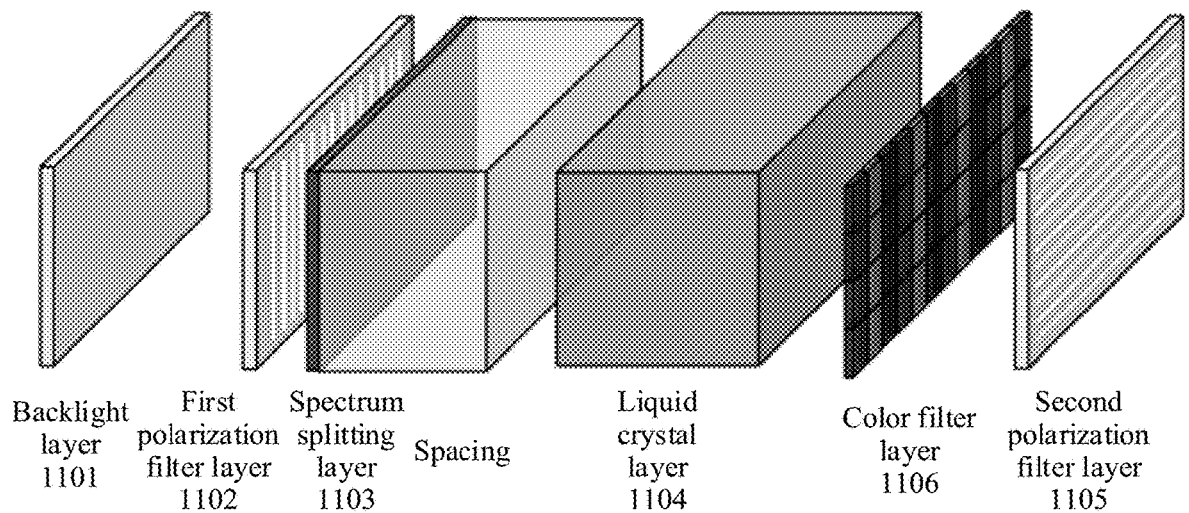
FIG. 7 is a schematic diagram of a structure of a backlight display assembly according to an embodiment of this application.

FIG. 7 is a schematic diagram of a structure of another backlight display assembly according to an embodiment of this application.

As shown in FIG. 7, the backlight display assembly includes a backlight layer 1101, a first polarization filter layer 1102, a spectrum splitting layer 1103, a liquid crystal layer (or an electronically controlled liquid crystal layer) 1104, a second polarization filter layer 1105, and a color filter layer 1106.

Figure 8:
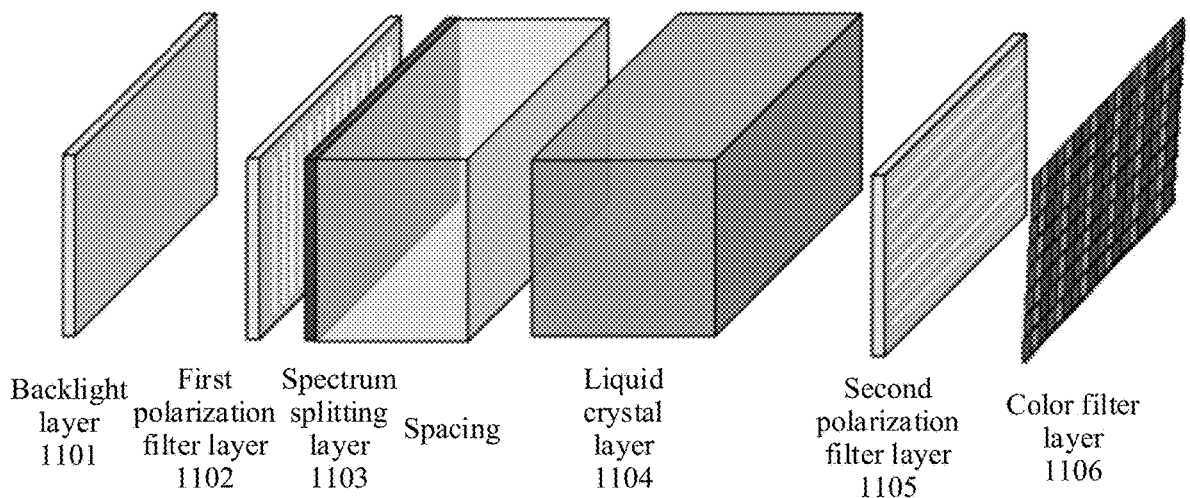
FIG. 8 is a schematic diagram of a structure of another backlight display assembly according to an embodiment of this application.

The first polarization filter layer 1102 is disposed between the backlight layer 1101 and the spectrum splitting layer 1103, the liquid crystal layer 1104 is disposed between the spectrum splitting layer 1103 and the color filter layer 1106, the spectrum splitting layer 1103 and the liquid crystal layer 1104 are spaced from each other, the second polarization filter layer 1105 is disposed between the liquid crystal layer 1104 and the color filter layer 1106 (a structure shown in FIG. 8); or the color filter layer 1106 is disposed between the liquid crystal layer and the second polarization filter layer 1105 (the structure shown in FIG. 7).

The backlight layer 1101 may be understood with reference to the backlight layer described in the foregoing embodiment, the spectrum splitting layer 1103 may be understood with reference to the spectrum splitting layer described in the foregoing embodiment, and the color filter layer may be understood with reference to the color filter layer described in the foregoing embodiment. This is not described herein again. For understanding of the first polarization filter layer 1102, the second polarization filter layer 1105, and the electronically controlled liquid crystal layer 1104, refer to two polarization layers and an electronically controlled liquid crystal layer in a conventional LCD structure. Details are not described herein again.

Figure 9:
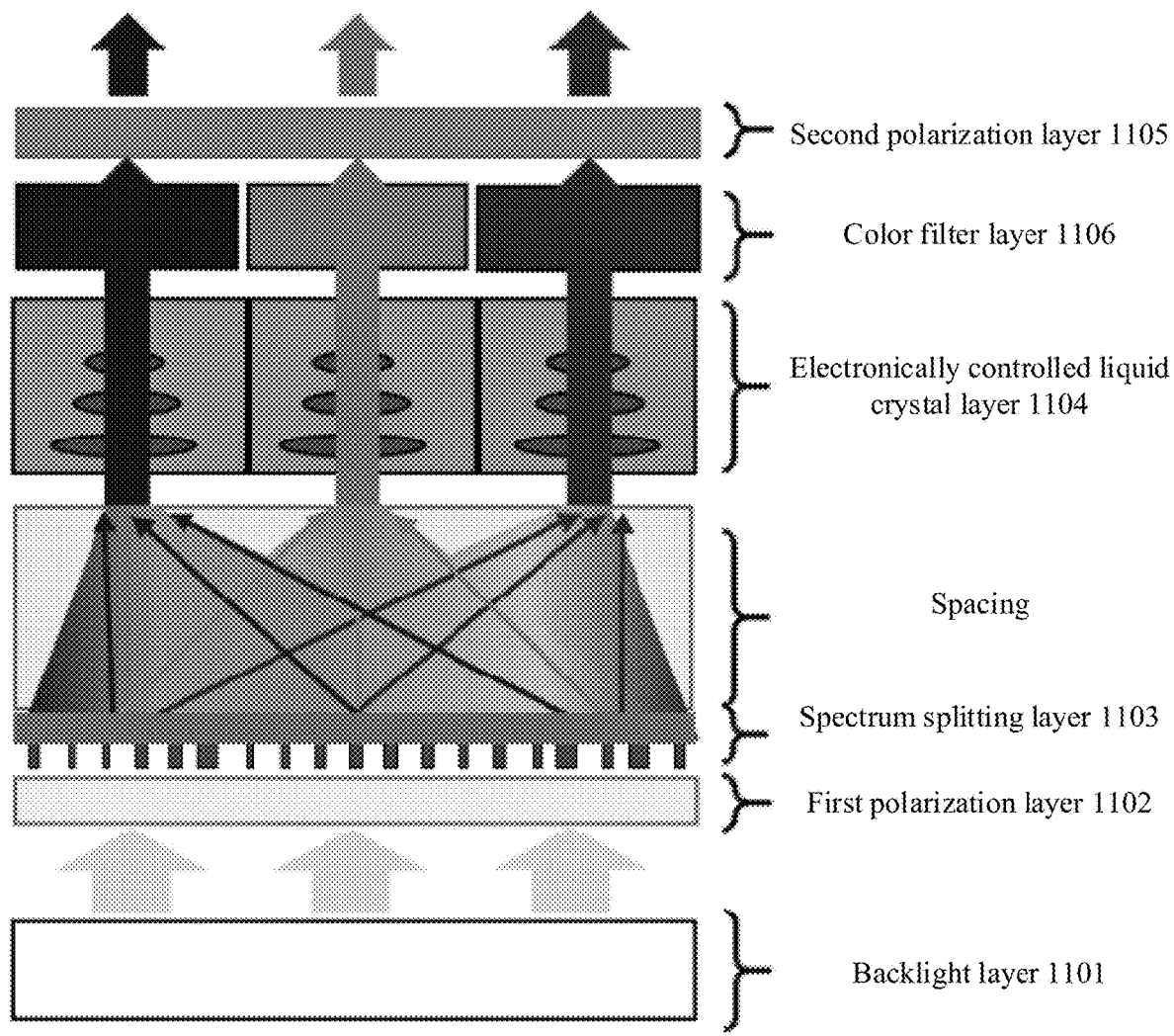
FIG. 9 is a schematic diagram of a structure of still another backlight display assembly according to an embodiment of this application.

Refer to FIG. 9. Compared with a backlight display assembly on which a spectrum splitting layer is not used, this structure can enable a large quantity of optical signals in a same frequency in optical signals sent by the backlight layer can reach a target area in the color filter layer, where a frequency of the target area is the same frequency. Descriptions are provided below by using an example in which the color filter layer is an RGB color filter layer. The RGB color filter layer can enable most red light in incident light of the green color filter and the blue color filter to be refracted into incident light of the red color filter, most blue light in the incident light of the green color filter and the red color filter to be refracted into incident light of the blue color filter, and most green light in incident light of the red color filter and the blue color filter to be refracted to incident light of the green color filter. This greatly improves backlight utilization.

Figure 10:
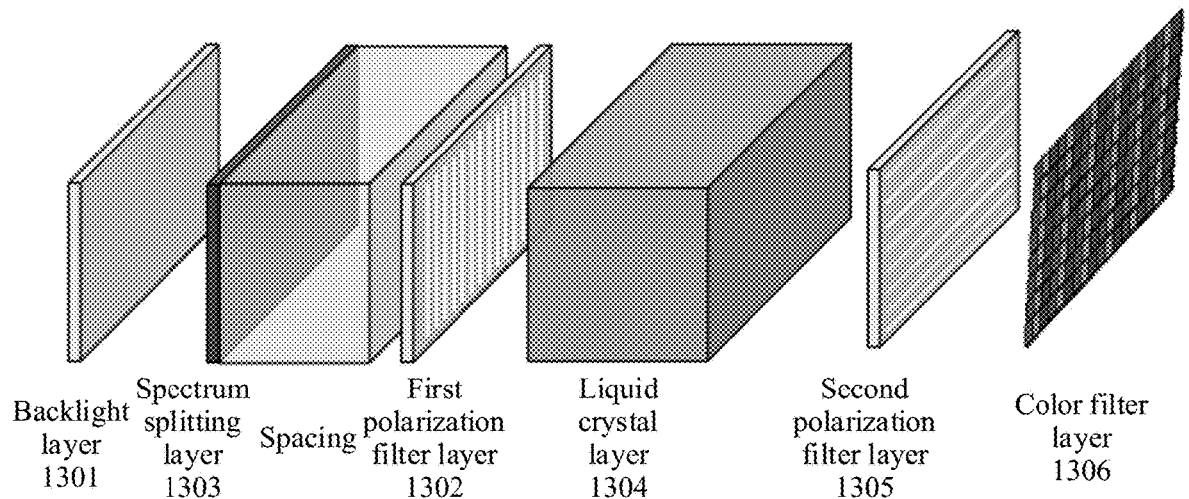
FIG. 10 is a schematic diagram of a structure of yet another backlight display assembly according to an embodiment of this application.

FIG. 10 is a schematic diagram of a structure of another backlight display assembly according to an embodiment of this application.

As shown in FIG. 10, the backlight display assembly includes a backlight layer 1301, a first polarization filter layer 1302, a spectrum splitting layer 1303, a liquid crystal layer (or an electronically controlled liquid crystal layer) 1304, a second polarization filter layer 1305, and a color filter layer 1306.

Figure 11:
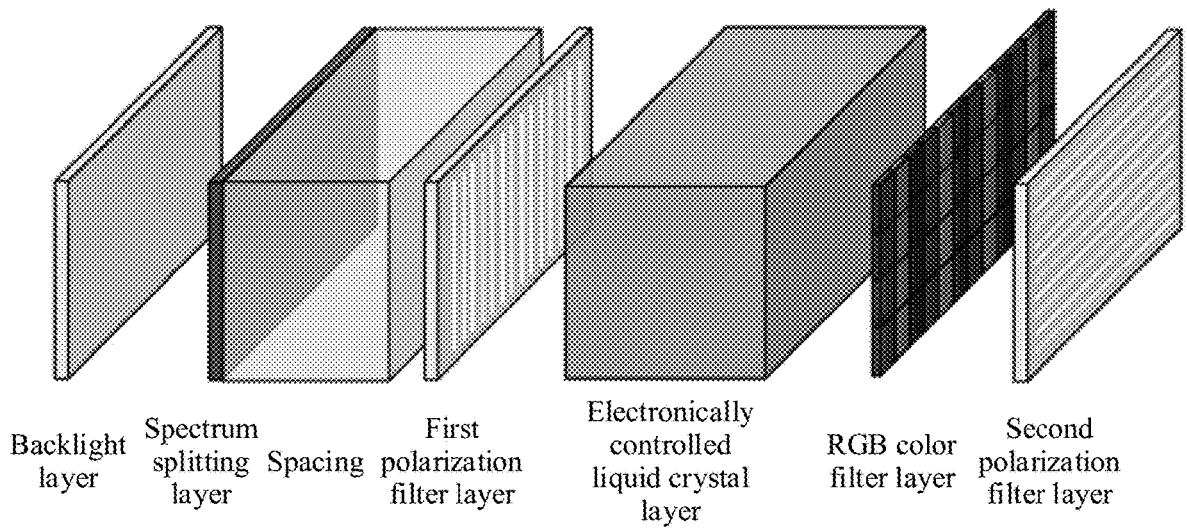
FIG. 11 is a schematic diagram of a structure of still yet another backlight display assembly according to an embodiment of this application.

The first polarization filter layer 1302 is disposed between the spectrum splitting layer 1303 and the liquid crystal layer 1304, and the second polarization filter layer 1305 is disposed between the liquid crystal layer 1304 and the color filter layer 1306; or the color filter layer 1306 is disposed between the liquid crystal layer and the second polarization filter layer 1305 (a structure shown in FIG. 11), the liquid crystal layer is disposed on a side close to the spectrum splitting layer 1303, and the color filter layer 1306 is disposed on a side away from the spectrum splitting layer 1303. It should be noted that the polarization layer is sometimes referred to as a polarization filter layer in this application, and the polarization layer and the polarization filter layer have a same meaning.

The backlight layer 1301 may be understood with reference to the backlight layer described in the foregoing embodiment, the spectrum splitting layer 1303 may be understood with reference to the spectrum splitting layer described in the foregoing embodiment, and the color filter layer may be understood with reference to the color filter layer described in the foregoing embodiment. This is not described herein again. For understanding of the first polarization filter layer 1302, the second polarization filter layer 1305, and the electronically controlled liquid crystal layer 1304, refer to the two polarization layers and the electronically controlled liquid crystal layer in the conventional LCD structure. Details are not described herein again.

Figure 12:
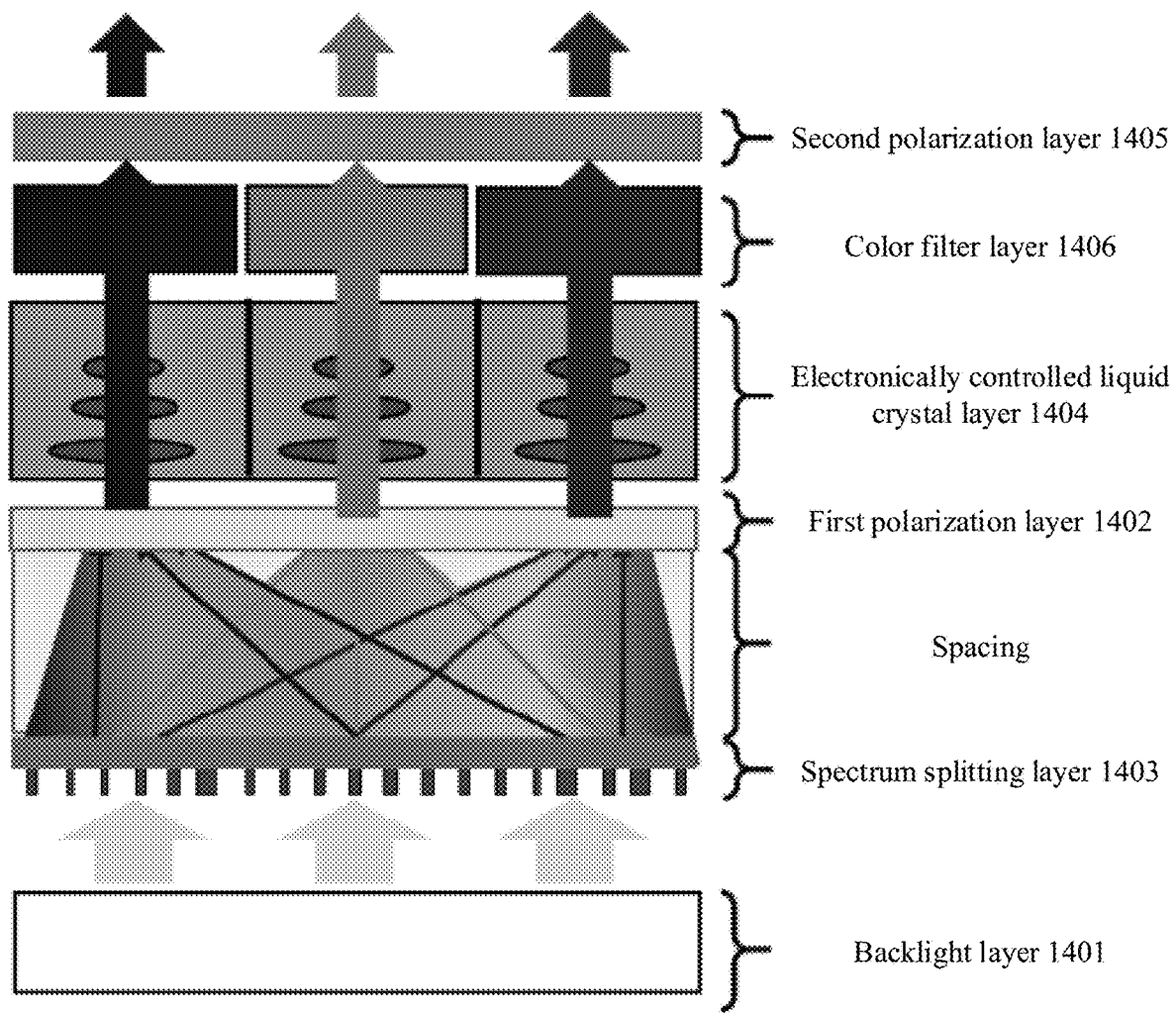
FIG. 12 is a schematic diagram of a structure of further another backlight display assembly according to an embodiment of this application.

Refer to FIG. 12. Compared with a backlight display assembly on which a spectrum splitting layer is not used, this structure can enable a large quantity of optical signals in a same frequency in optical signals sent by the backlight layer can reach a target area in the color filter layer, where a frequency of the target area is the same frequency. An example in which the color filter layer is an RGB color filter layer is used for description, so that most red light in incident light of the green color filter and the blue color filter can be refracted into incident light of the red color filter, most blue light in the incident light of the green color filter and the red color filter can be refracted into incident light of the blue color filter, and most green light in incident light of the red color filter and the blue color filter can be refracted to incident light of the green color filter. This greatly improves backlight utilization.

To better demonstrate beneficial effects brought by this solution, the following provides description with reference to a simulation experiment result.

Figure 13:
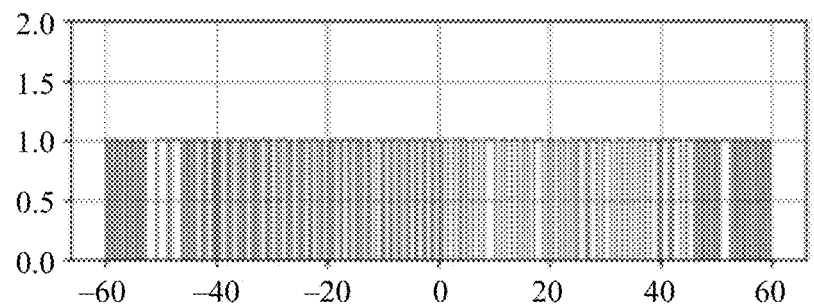
FIG. 13 is a schematic diagram of a structure of another spectrum splitting layer according to an embodiment of this application.
Figure 14:
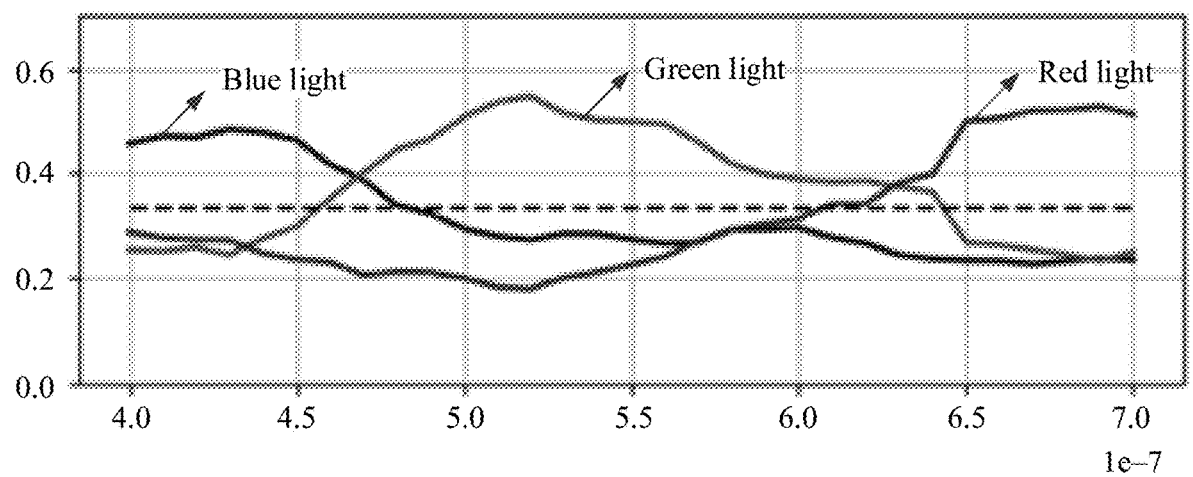
FIG. 14 is a simulation experiment diagram according to an embodiment of this application.
Figure 15:
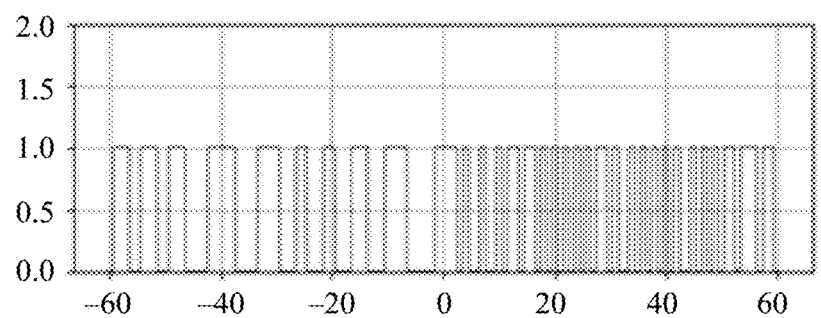
FIG. 15 is a schematic diagram of a structure of still another spectrum splitting layer according to an embodiment of this application.
Figure 16:
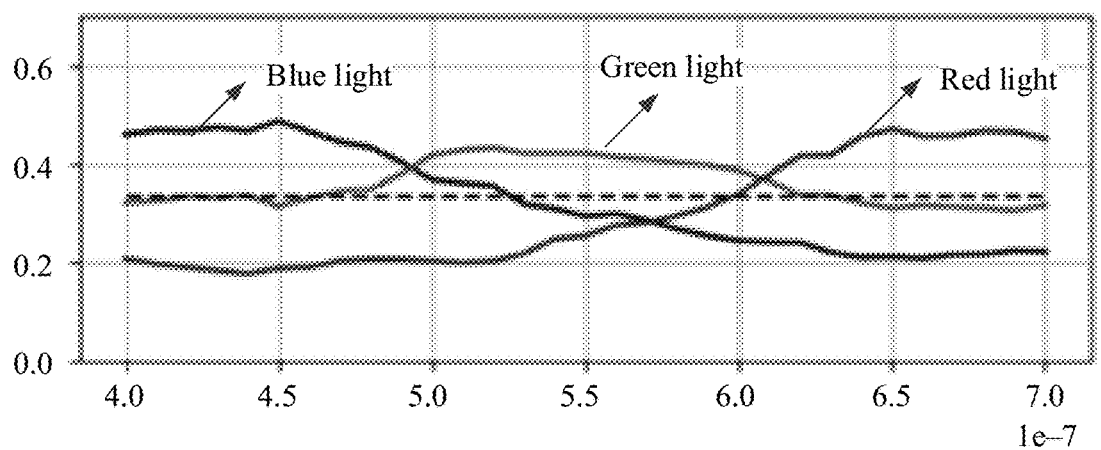
FIG. 16 is another simulation experiment diagram according to an embodiment of this application.
Figure 17:
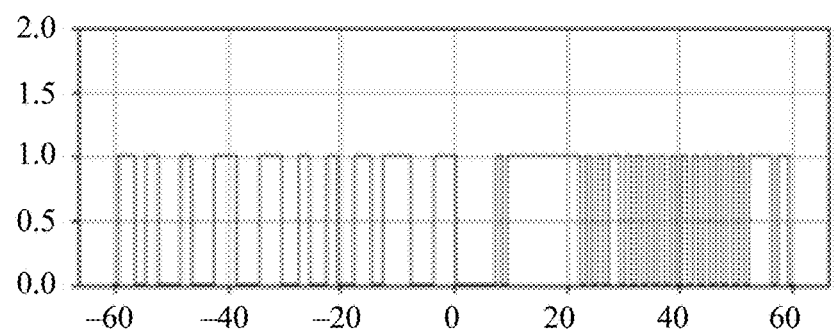
FIG. 17 is a schematic diagram of a structure of yet another spectrum splitting layer according to an embodiment of this application.
Figure 18:
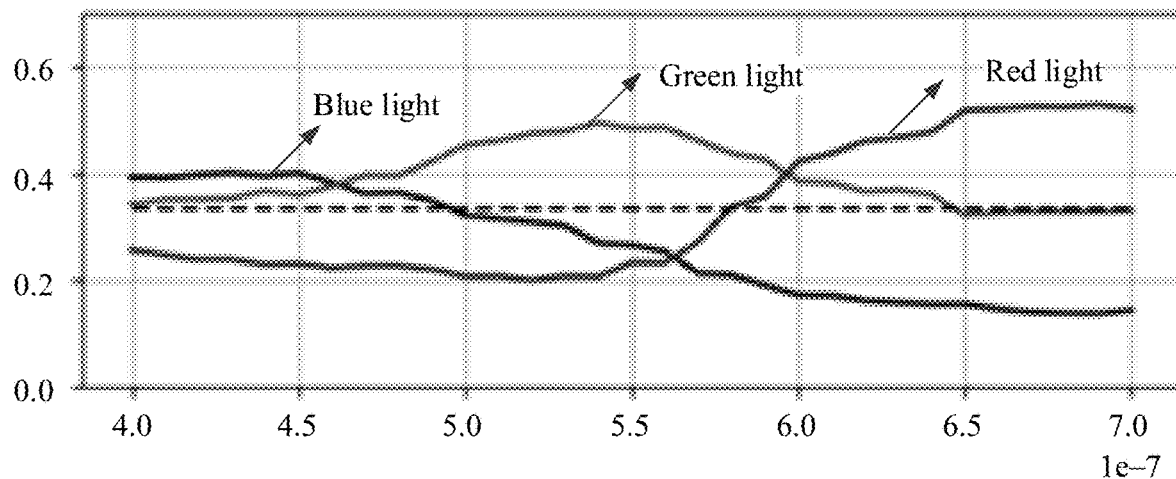
FIG. 18 is still another simulation experiment diagram according to an embodiment of this application.

FIG. 13 is a schematic diagram of a group of micro-nano structures in a plurality of groups of micro-nano structures that are periodically distributed. The group of micro-nano structures includes a plurality of same strip structures, and only a distance between the strip structures is used as an adjustable variable. In one embodiment, a height of each strip structure is 500 nm, a minimum size of a micro-nano structure is 500 nm, a color pixel size of 120 μm corresponds to about 218 ppi (pixels per inch), and a thickness of a spacing layer is 350 μm. A simulation result shown in FIG. 14 is a schematic diagram of a simulation result when a group of micro-nano structures shown in FIG. 13 are periodically distributed. Average light utilization of this structure is 45.2%, which is 35.7% higher than that of a traditional color filtering solution. An average transmittance rate of red light is 44.1%, which is 32.4% higher than that of the color filtering solution. An average transmittance rate of green light is 48.7%, which is 46.2% higher than that of the traditional color filtering solution. An average transmittance rate of blue light is 42.9%, which is 28.8% higher than that of the traditional color filtering solution. As shown in FIG. 15, another micro-nano structure is shown. In one embodiment, a height of a strip structure is 500 nm, a minimum size of a micro-nano structure is 1000 nm, a color pixel size of 120 μm corresponds to about 218 ppi, and a thickness of a spacing layer is 350 μm. A simulation result shown in FIG. 16 is a schematic diagram of a simulation result when a group of micro-nano structures shown in FIG. 15 are periodically distributed. Average light utilization of this structure is 43.8%, which is 31.5% higher than that of a traditional color filtering solution. An average transmittance rate of red light is 43.6%, which is 30.9% higher than that of the color filtering solution. An average transmittance rate of green light is 41.9%, which is 25.8% higher than that of the traditional color filtering solution. An average transmittance rate of blue light is 45.9%, which is 37.8% higher than that of the traditional color filtering solution. As shown in FIG. 17, another micro-nano structure is shown. In one embodiment, a height of a strip structure is 600 nm, a minimum size of a micro-nano structure is 1000 nm, a color pixel size of 120 μm corresponds to about 218 ppi, and a thickness of a spacing layer is 350 μm. A simulation result shown in FIG. 18 is a schematic diagram of a simulation result when a group of micro-nano structures shown in FIG. 17 are periodically distributed. Average light utilization of this structure is 44.8%, which is 34.5% higher than that of a traditional color filtering solution. An average transmittance rate of red light is 49.3%, which is 48% higher than that of the color filtering solution. An average transmittance rate of green light is 46.7%, which is 40.2% higher than that of the traditional color filtering solution. An average transmittance rate of blue light is 38.5%, which is 15.6% higher than that of the traditional color filtering solution.

It can be learned that, according to the solution provided in this embodiment of this application, backlight utilization can be significantly improved. It should be noted that, when a shape, a size, and a material of a micro-nano structure are fixed, arrangement positions of a plurality of micro-nano structures that meet a light flux requirement may be obtained by using a simulation experiment. In a possible implementation, a maximum luminous flux may be used as a training target of a model, and when a shape, a size, and a material of the micro-nano structure are fixed, optimal arrangement positions of the plurality of micro-nano structures are obtained by using an output structure of the model.

In addition, the foregoing several simulation experiments are performed to simplify a structure design process. Therefore, a large quantity of simulation parameters remain unchanged. When most simulation parameters are variable, the structure may be optimized from a plurality of aspects, to obtain a better effect and better improve backlight utilization. Details are not described in this embodiment of this application. For example, refer to FIG. 19 and FIG. 20. Several other possible structures are provided. As shown in FIG. 19, a height of a columnar structure may be set to a variable parameter. As shown in FIG. 20, a shape of a micro-nano structure may also be a variable parameter. It should be noted that because there are too many structures that may be involved, embodiments of this application cannot be exhaustive.

In the specification, claims, and accompanying drawings of this application, the terms "first", "second", "third", "fourth", and so on (if existent) are intended to distinguish between similar objects but do not necessarily indicate an order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a procedure, method, system, product, or device that includes a list of operations or units is not necessarily limited to those expressly listed operations or units, but may include other operations or units not expressly listed or inherent to such a procedure, method, product, or device.

In the description of this application, "a plurality of" means two or more than two, unless otherwise limited.

In this application, unless otherwise specified and limited, the terms such as "mount", "link", "connect", "fasten", and "dispose" should be understood broadly. For example, the term "connect" may be a fixed connection, may be a detachable connection, or may be integration; may be a mechanical connection or may be an electrical connection; or may be a direct connection, may be an indirect connection implemented by using an intermediate medium, or may be communication inside two elements or an interaction relationship between two elements. A person of ordinary skill in the art may interpret meanings of the foregoing terms in this application according to cases.

In descriptions of this application, it should be understood that a direction or a position relationship indicated by terms such as "length", "width", "upper", "lower", "front", "back", "left", "right", "vertical", "horizontal", "top", "bottom", "inside", or "outside" is a direction or a position relationship shown based on the accompanying drawings, is merely used to facilitate descriptions of this application and simplify the descriptions, but is not intended to indicate or imply that an indicated apparatus or element needs to have a particular direction, and needs to be constructed and operated in a particular direction, and therefore cannot be construed as a limitation on this application.

Some terms are used in the specification and claims to refer to components. A person skilled in the art can understand that a same component may be named differently by hardware manufacturers. In the specification and subsequent claims, components are distinguished between each other based on functional differences, instead of naming differences. The terms "including" and "comprising" mentioned in the specification and the claims are open class terms and should be construed as including but not limited to.

The foregoing descriptions are merely embodiments of this application, but are not intended to limit this application. Any modification, equivalent replacement, or improvement made without departing from the principle of this application should fall within the protection scope of this application.

What is claimed is:

1. A backlight display assembly, comprising:
a light filter layer comprising a plurality of light filter units, wherein each of the plurality of light filter units comprises a plurality of different light filters;
a spectrum splitting layer disposed on one side of the light filter layer and spaced from the light filter layer, wherein the spectrum splitting layer comprises a micro-nano structure comprising a plurality of strip structures, and wherein an arrangement direction of the plurality of strip structures corresponds to an arrangement direction of the plurality of different light filters;
a backlight layer disposed on one side of the spectrum splitting layer and away from the light filter layer;
a liquid crystal layer; and
a first polarization layer disposed between the spectrum splitting layer and the liquid crystal layer, wherein
the micro-nano structure is configured to:
separate an optical signal of a first frequency from an optical signal sent by the backlight layer; and
converge the optical signal of the first frequency onto a first light filter in the plurality of different light filters; and
the first light filter is configured to select the optical signal of the first frequency.

2. The assembly according to claim 1, wherein the plurality of strip structures are aligned from a beginning to an end.

3. The assembly according to claim 1, wherein the spectrum splitting layer comprises a plurality of groups of micro-nano structures that are periodically distributed.

4. The assembly according to claim 3, wherein a plurality of groups of light filtering units are periodically distributed, and at least one group of the plurality of groups of light filtering units corresponds to at least one group of the micro-nano structures.

5. The assembly according to claim 1, wherein the spectrum splitting layer further comprises a first medium, and wherein a refractive index of the first medium is different from a refractive index of a medium comprised in the micro-nano structure.

6. The assembly according to claim 1, wherein a second medium exists between the spectrum splitting layer and the light filter layer, and a loss caused by the second medium to the optical signal sent by the backlight layer is less than a first preset threshold.

7. The assembly of claim 6, wherein the second medium is a medium whose transparency is greater than a second preset threshold.

8. The assembly according to claim 6, wherein the second medium comprises at least one of silicon dioxide, silicon nitride, silicon carbide, aluminum trioxide, titanium dioxide, gallium nitride, polymethyl methacrylate, a photoresist material, vacuum, or air.

9. The assembly according to claim 1, wherein the micro-nano structure comprises a supersurface or a diffractive optical element DOE.

10. The assembly according to claim 1, wherein the assembly further comprises a substrate, and the micro-nano structure is distributed on the substrate.

11. The assembly according to claim 10, wherein a loss caused by the substrate to the optical signal sent by the backlight layer is less than a third preset threshold.

12. The assembly according to claim 1, wherein the assembly further comprises:
a second polarization layer, wherein
the liquid crystal layer is disposed between the spectrum splitting layer and the light filter layer, the spectrum splitting layer and the liquid crystal layer are spaced from each other, and the second polarization layer is disposed between the liquid crystal layer and the light filter layer; or
the light filter layer is disposed between the liquid crystal layer and the second polarization layer.

13. The assembly according to claim 1, wherein the assembly further comprises:
a second polarization layer, wherein
the second polarization layer is disposed between the liquid crystal layer and the light filter layer; or
the light filter layer is disposed between the liquid crystal layer and the second polarization layer, the liquid crystal layer is disposed on a side close to the spectrum splitting layer, and the light filter layer is disposed on a side away from the spectrum splitting layer.

14. The assembly according to claim 1, wherein heights of the plurality of strip structures are the same, and each of the plurality of strip structures is a cuboid.

15. The assembly according to claim 14, wherein
shapes of a plurality of strip structures corresponding to the first light filter are different from shapes of a plurality of strip structures corresponding to a second light filter;
the micro-nano structure is further configured to:
separate an optical signal of a second frequency from the optical signal sent by the backlight layer; and
converge the optical signal of the second frequency onto the second light filter in the plurality of different light filters; and
the second light filter is configured to select the optical signal of the second frequency.

16. A display, comprising:
a backlight display assembly, comprising:
a light filter layer comprising a plurality of light filter units, wherein each of the plurality of light filter units comprises a plurality of different light filters;
a spectrum splitting layer disposed on one side of the light filter layer and spaced from the light filter layer, wherein the spectrum splitting layer comprises a micro-nano structure comprising a plurality of strip structures, and wherein an arrangement direction of the plurality of strip structures corresponds to an arrangement direction of the plurality of different light filters; and a backlight layer disposed on one side of the spectrum splitting layer and away from the light filter layer;

a liquid crystal layer; and a first polarization layer that is disposed between the spectrum splitting layer and the liquid crystal layer, wherein the micro-nano structure is configured to:
separate an optical signal of a first frequency from an optical signal sent by the backlight layer; and
converge the optical signal of the first frequency onto a first light filter in the plurality of different light filters; and the first light filter is configured to select the optical signal of the first frequency.

17. An electronic device, comprising:
a display, the display comprising:
a backlight display assembly, the backlight display assembly comprising:
a light filter layer comprising a plurality of light filter units, wherein each of the plurality of light filter units comprises a plurality of different light filters;
a spectrum splitting layer disposed on one side of the light filter layer and spaced from the light filter layer, wherein the spectrum splitting layer comprises a micro-nano structure comprising a plurality of strip structures, and wherein an arrangement direction of the plurality of strip structures corresponds to an arrangement direction of the plurality of different light filters;
a backlight layer disposed on one side of the spectrum splitting layer and away from the light filter layer;
a liquid crystal layer; and
a first polarization layer that is disposed between the spectrum splitting layer and the liquid crystal layer, wherein
the micro-nano structure is configured to:
separate an optical signal of a first frequency from an optical signal sent by the backlight layer; and
converge the optical signal of the first frequency onto a first light filter in the plurality of different light filters; and
the first light filter is configured to select the optical signal of the first frequency.

18. The electronic device according to claim 17, wherein the electronic device is at least one of a desktop computer, a laptop computer, a tablet computer, a mobile phone, glasses, a television, an in-vehicle device, a watch, or a band.

19. The electronic device according to claim 17, wherein the spectrum splitting layer comprises a plurality of groups of micro-nano structures that are periodically distributed.

20. The electronic device according to claim 19, wherein a plurality of groups of light filtering units are periodically distributed, and at least one group of the plurality of groups of light filtering units corresponds to at least one group of the micro-nano structures.

* * * * *